United States Patent
Bishop et al.

(10) Patent No.: US 10,451,808 B2
(45) Date of Patent: Oct. 22, 2019

(54) MEMS DEVICES FOR SMART LIGHTING APPLICATIONS

(71) Applicants: TRUSTEES OF BOSTON UNIVERSITY, Boston, MA (US); David J. Bishop, Brookline, MA (US); Thomas Little, Newtown, MA (US); Jessica Morrison, Lynn, MA (US); Matthias Imboden, Brookline, MA (US)

(72) Inventors: David J. Bishop, Brookline, MA (US); Thomas Little, Newton, MA (US); Jessica Morrison, Lynn, MA (US); Matthias Imboden, Brookline, MA (US)

(73) Assignee: TRUSTEES OF BOSTON UNIVERSITY, Boston, MA (US)

( * ) Notice: Subject to any disclaimer, the term of this patent is extended or adjusted under 35 U.S.C. 154(b) by 0 days.

(21) Appl. No.: 15/747,247

(22) PCT Filed: Jul. 22, 2016

(86) PCT No.: PCT/US2016/043723
§ 371 (c)(1),
(2) Date: Jan. 24, 2018

(87) PCT Pub. No.: WO2017/019557
PCT Pub. Date: Feb. 2, 2017

(65) Prior Publication Data
US 2018/0231715 A1     Aug. 16, 2018

Related U.S. Application Data

(60) Provisional application No. 62/196,791, filed on Jul. 24, 2015.

(51) Int. Cl.
G02B 6/12      (2006.01)
G02B 6/35      (2006.01)
(Continued)

(52) U.S. Cl.
CPC ........... *G02B 6/3518* (2013.01); *G02B 6/357* (2013.01); *G02B 6/3584* (2013.01); *G02B 26/02* (2013.01);
(Continued)

(58) Field of Classification Search
CPC .... G02B 6/3518; G02B 26/085; G02B 6/357; G02B 6/3584; G02B 26/06; G02B 26/02; G02B 26/0841
See application file for complete search history.

(56) References Cited

U.S. PATENT DOCUMENTS 4,698,602 A    10/1987   Armitage
6,347,167 B1    2/2002   Hagelin
(Continued)

*Primary Examiner* — Ellen E Kim
(74) *Attorney, Agent, or Firm* — Nixon Peabody LLP

(57) ABSTRACT

The invention provides a device comprising a movable micromirror adapted to receive light from one or more light source(s) and manipulate the reflected light. The micromirror can be actuated electrothermally. In particular, the micromirror is adapted to do at least one of: (a) tipping along a first axis; (b) tilting along a second axis; (c) changing focal length (i.e., varifocal mode); and (d) elevating (i.e., piston mode). The invention also provides a system comprising at least one device comprising a movable micromirror and at least one light source. The invention can be used in smart lighting applications.

31 Claims, 25 Drawing Sheets

(51) Int. Cl.
  *G02B 26/02*   (2006.01)
  *G02B 26/06*   (2006.01)
  *G02B 26/08*   (2006.01)

(52) U.S. Cl.
  CPC ........... *G02B 26/06* (2013.01); *G02B 26/085* (2013.01); *G02B 26/0841* (2013.01)

(56) References Cited

U.S. PATENT DOCUMENTS

| | | | |
|---|---|---|---|
| 6,513,939 | B1 | 2/2003 | Fettig et al. |
| 7,428,353 | B1* | 9/2008 | Milanovic .......... G02B 26/0841 |
| | | | 385/14 |
| 7,532,377 | B2* | 5/2009 | Miles ................. G02B 26/0841 |
| | | | 345/107 |
| 7,598,688 | B2* | 10/2009 | Slor .................... G02B 7/1821 |
| | | | 318/119 |
| 2001/0044225 | A1 | 11/2001 | Eldridge et al. |
| 2002/0093721 | A1* | 7/2002 | Knipe ................ G02B 26/0841 |
| | | | 359/291 |
| 2002/0171327 | A1 | 11/2002 | Miller et al. |
| 2003/0116848 | A1 | 6/2003 | Cunningham et al. |
| 2005/0136663 | A1 | 6/2005 | Gan et al. |
| 2006/0203362 | A1 | 9/2006 | Gohman et al. |
| 2011/0241702 | A1* | 10/2011 | Berkcan ................ G01R 29/12 |
| | | | 324/633 |
| 2011/0292490 | A1 | 12/2011 | Xie et al. |
| 2012/0197442 | A1* | 8/2012 | Xie .................... G02B 26/0866 |
| | | | 700/275 |
| 2014/0063331 | A1 | 3/2014 | Goldenberg et al. |

\* cited by examiner

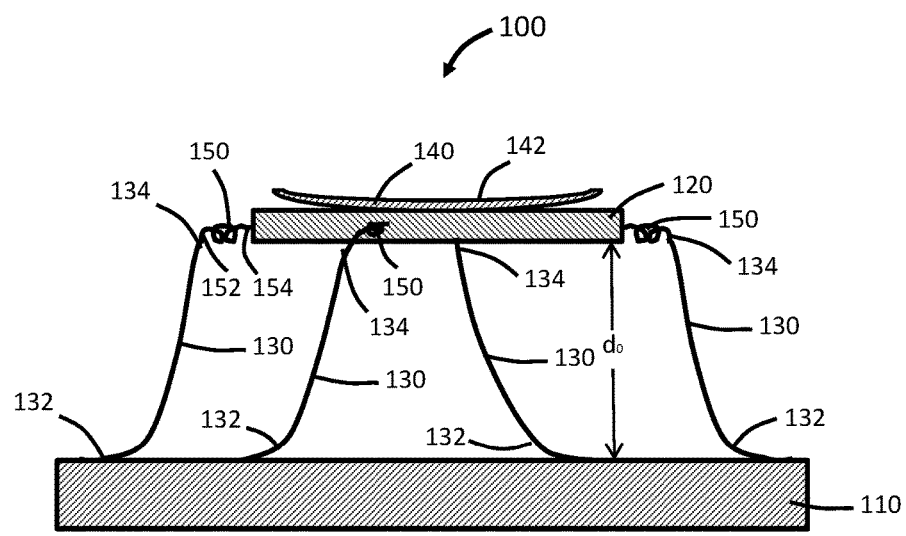
FIG. 1
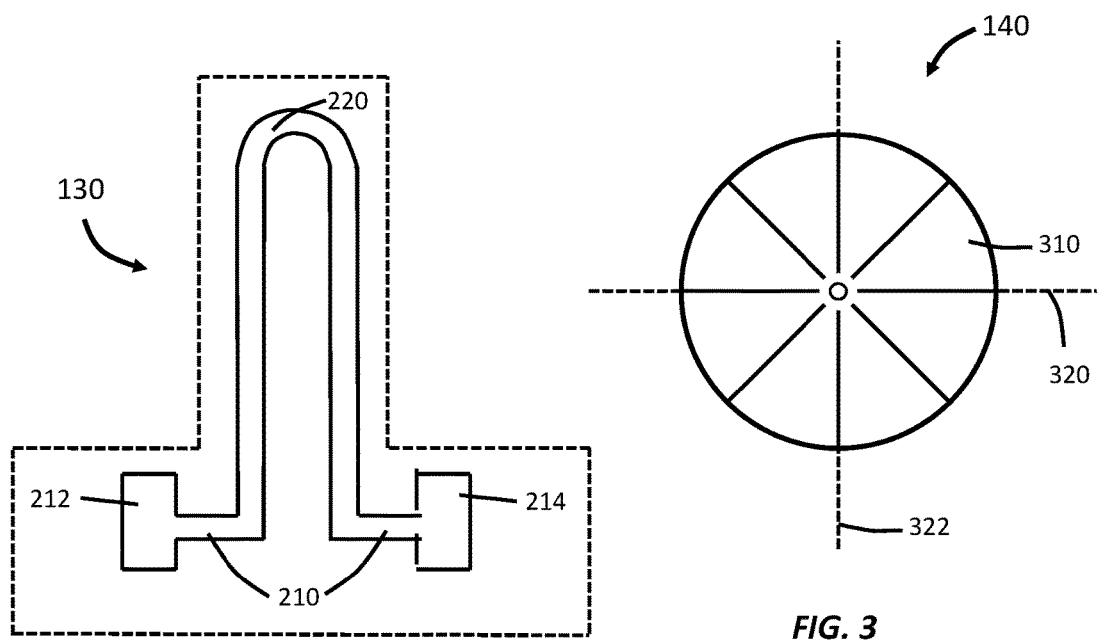
FIG. 2
FIG. 3

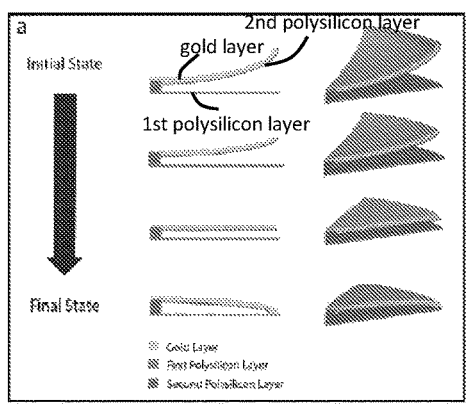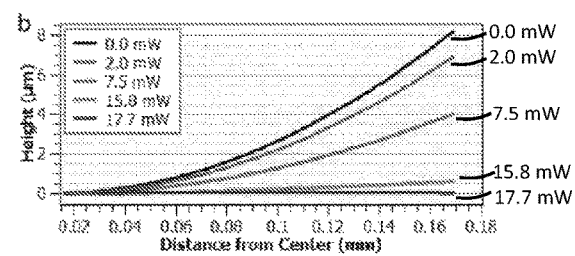
FIG. 10A
FIG. 10B
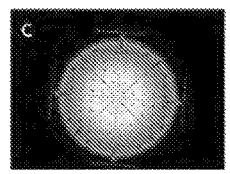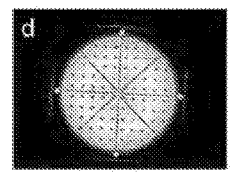
FIG. 10C
FIG. 10D

MEMS DEVICES FOR SMART LIGHTING APPLICATIONS

CROSS-REFERENCE TO RELATED APPLICATIONS

This application is a 35 U.S.C. § 371 National Phase Entry Application of International Application No. PCT/US2016/043723, filed Jul. 22, 2016, which designates the U.S. and which claims any and all benefits as provided by law including benefit under 35 U.S.C. § 119(e) of the U.S. Provisional Application No. 62/196,791, filed Jul. 24, 2015, the contents of each of which are incorporated herein by reference in their entireties.

GOVERNMENT SUPPORT

This invention was made with Government Support under Contract No. EEC0812056 awarded by the National Science Foundation. The Government has certain rights in the invention.

TECHNICAL FIELD

The present invention relates to microelectromechanical systems (MEMS) micromirrors and their applications in e.g., smart lighting.

BACKGROUND

In almost all lighting applications, the distribution of light from the source is fixed in time. Lights can be turned on and off and/or dimmed but the distribution of the photons that do leave the source is generally static. This means that much of the light is not going into a useful direction. There are two limits to this problem. In an incandescent bulb, the light is emitted almost uniformly in space, essentially equally intense in all directions. Typical light fixtures try to compensate for this by having mirrors or other reflecting surfaces inside the luminaire to direct the light to where it is wanted. Laser diodes are in the opposite limit. While extremely efficient in terms of generating photons from electrons, they emit light that is uni-directional, a tightly collimated beam. For luminaires built with these sources, one has the opposite problem, that of diffusing a collimated beam. This is typically done with some kind of translucent element such as a plastic dome. But in either solution the distributions do not change in time.

SUMMARY

The invention relates to devices and systems comprising micromirrors that can be actuated through thermal, electrothermal, or magnetic means. When light from a light source impinges on the micromirror, the micromirror can be actuated to manipulate the reflected light. For example, the micromirror can manipulate the reflected light for visible light communication. In another example, the micromirror can change the light distribution, intensity, and/or color in a room.

In one aspect, the invention relates to a device comprising (i) a base substrate; (ii) a platform suspended over the base substrate; (iii) a plurality of support elements supporting the platform over the base substrate, wherein each support element has a first end and a second end, wherein the first end of each support element is mounted on the base substrate and connected to an electrical source, and wherein the second end of each support element is suspended over the base substrate; and (iv) a micromirror at least partially mounted on the platform, wherein the micromirror includes (a) a multimorph material movable in response to a heat source, or (b) a magnetic material movable in response to a magnetic field, whereby application of an electrical signal to at least one of the support elements actuates the micromirror.

In another aspect, the invention relates to a system comprising at least one light source and at least one device described in the above aspect, wherein the at least one device is adapted to reflect light from the at least one light source and manipulate the reflected light.

In accordance with some embodiments of the invention, the device can further comprise a plurality of spring elements, wherein each spring element has a first end and a second end, and wherein the first end of each spring element is connected to the second end of each support element, and wherein the second end of each spring element is connected to the platform.

In accordance with some embodiments of the invention, each support element includes a multimorph material movable in response to the electrical signal from the electrical source.

In accordance with some embodiments of the invention, the micromirror is adapted to do at least one of: (a) tipping along a first axis when the electrical signal is applied to one of the support elements; (b) tilting along a second axis when the electrical signal is applied to one of the support elements; (c) changing focal length when the electrical signal is applied between any of two support elements; and (d) elevating with respect to the base substrate when the electrical signal is applied to each of the support elements.

In accordance with some embodiments of the invention, the tipping and tilting can each be configured to have a range from −20 degrees to +20 degrees, and larger or smaller ranges can be provided by changing the geometrical structures of the device.

In accordance with some embodiments of the invention, the change in focal length can have a range from −0.48 mm to 20.5 mm, and larger or smaller ranges can be provided by changing the geometrical structures of the device.

In accordance with some embodiments of the invention, the micromirror elevating distance can range from about 100 μm (or less) to 1.0 mm (or more).

In accordance with some embodiments of the invention, the device comprises at least 3 support elements and at least 3 spring elements.

In accordance with some embodiments of the invention, the device comprises 4 support elements and 4 spring elements.

In accordance with some embodiments of the invention, each support element can comprise a first layer comprising polysilicon, and a second layer comprising gold, wherein the second layer is disposed on top of the first layer.

In accordance with some embodiments of the invention, each support element can further comprise an adhesion layer including chromium or titanium disposed between the first layer and the second layer.

In accordance with some embodiments of the invention, each spring element can be flexible.

In accordance with some embodiments of the invention, each spring element can be stretchable.

In accordance with some embodiments of the invention, each spring element can have a serpentine shape.

In accordance with some embodiments of the invention, each spring element can comprise a semiconductor or metal.

In accordance with some embodiments of the invention, each spring element can comprise polysilicon.

In accordance with some embodiments of the invention, each spring element can comprise an alloy.

In accordance with some embodiments of the invention, the platform has a shape selected from the group consisting of circular, oval, square, rectangular, pentagonal, and hexagonal.

In accordance with some embodiments of the invention, the platform can comprise a semiconductor or metal.

In accordance with some embodiments of the invention, the platform can comprise polysilicon, or single crystalline silicon.

In accordance with some embodiments of the invention, the micromirror can be center mounted on the platform.

In accordance with some embodiments of the invention, the micromirror can comprise a plurality of segments.

In accordance with some embodiments of the invention, the micromirror can comprise a first layer comprising polysilicon, and a second layer comprising gold, wherein the second layer is disposed on top of the first layer.

In accordance with some embodiments of the invention, the micromirror can further comprise an adhesion layer including chromium or titanium disposed between the first layer and the second layer.

In accordance with some embodiments of the invention, the device can further comprise a heating element positioned underneath the platform and adapted to heat up the micromirror.

In accordance with some embodiments of the invention, the heating element can comprise a laser chip or a heating coil.

In accordance with some embodiments of the invention, the at least one light source is a light-emitting diode or laser.

In accordance with some embodiments of the invention, the at least one light source is mounted on the micromirror.

In accordance with some embodiments of the invention, the at least one light source is suspended over the micromirror.

In accordance with some embodiments of the invention, the system can comprise an array of light sources. The array of light sources can be arranged in a geometric, ordered, or random pattern.

In accordance with some embodiments of the invention, the system can comprise an array of devices. The array of devices can be arranged in a geometric, ordered, or random pattern.

In accordance with some embodiments of the invention, the device or system can further comprise a control unit.

BRIEF DESCRIPTION OF THE DRAWINGS

The patent or application file contains at least one drawing executed in color. Copies of this patent or patent application publication with color drawings will be provided by the Office upon request and payment of the necessary fee.

FIG. 1 is a schematic of a cross section of a device 100 in accordance with some embodiments of the invention.

FIG. 2 is a schematic of a support element 130 in accordance with some embodiments of the invention.

FIG. 3 is a schematic of a micromirror 140 in accordance with some embodiments of the invention.

FIG. 10A is a diagram depicting bimorph deflection with increased applied power. The sequence is depicted as the wedges are heated.

FIG. 10B is a plot showing the average radial profile for various applied powers as measured using an optical profiler.

FIGS. 10C-10D show the data from the optical profiler as the mirror flattens depicted as a color gradient.

DETAILED DESCRIPTION

Figure 4A:
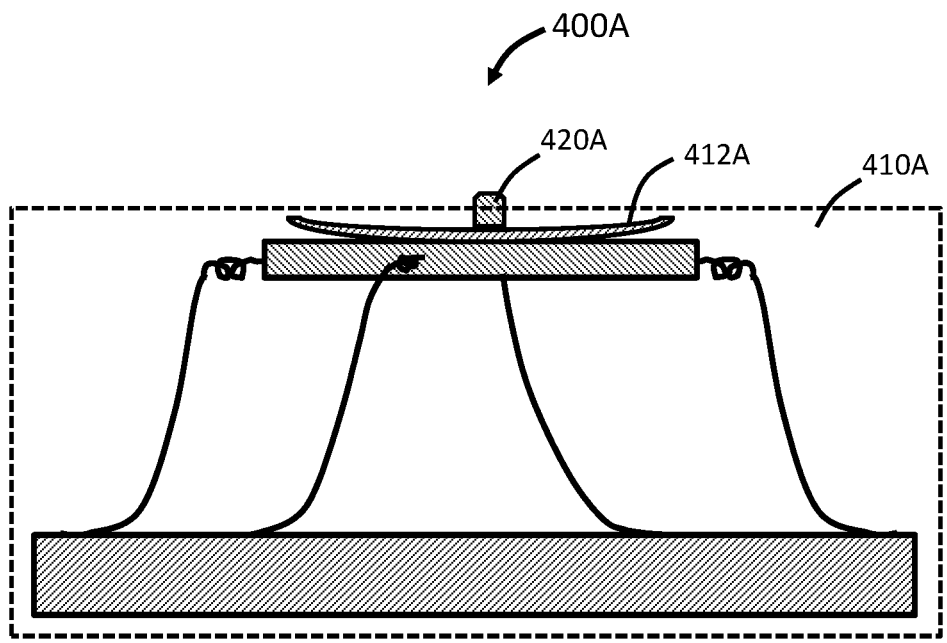
FIG. 4A is a schematic of a system 400A in accordance with some embodiments of the invention.

Aspects and embodiments of the invention relate to a movable micromirror. The micromirror can be actuated thermally, electrothermally, electrostatically and/or magnetically. In accordance with some embodiments of the invention, the micromirror is adapted to do at least one of: (a) tipping along a first axis; (b) tilting along a second axis; (c) changing focal length (i.e., varifocal mode); and (d) elevating (i.e., piston mode). And thus the micromirror can receive light from a nearby light source (e.g., LED, optical fiber or laser) and manipulate the reflected light for a variety of applications. The movable micromirrors according to embodiments of the invention can have four separately controllable degrees of freedom in a single device: wide deflection angles along two axes respectively, tunable focal length, and a piston mode.

FIG. 1 is a schematic of a cross section of a device 100 in accordance with some embodiments of the invention. The device 100 can comprise a base substrate 110, a platform 120, a plurality of support elements 130, and a micromirror 140. The plurality of support elements can support the platform 120, thus suspending the platform 120 by a predefined distance $d_0$ over the base substrate 110. The predefined distance $d_0$ can be zero or greater, e.g., 1 μm to 800 μm, 1 μm to 700 μm, 1 μm to 600 μm, 1 μm to 500 μm, 1 μm to 400 μm, 1 μm to 300 μm, or 1 μm to 200 μm. The micromirror 140 can be at least partially mounted on the platform 120.

In accordance with some embodiments of the invention, each support element 130 can comprise a first end 132 and a second end 134, wherein the first end 132 can be mounted to the base substrate 110 and connected to an electrical source, and the second end 134 can be suspended over the base substrate 110 and coupled to the platform 120. The electrical source can be a current source, a voltage source, or both. The electrical source can provide an electrical signal of sufficient amount to actuate the support elements 130 or micromirror 140. For example, the electrical source can provide a current in the range of 10 mA to 1000 mA (e.g., 10 mA to 800 mA, 10 mA to 500 mA, or 10 mA to 300 mA), or a voltage in the range of 1 mV to 100 V (e.g., 1 mV to 50 V, 10 m V to 30 V, 10 mV to 10 V, or 10 mV to 500 mV). The number of support elements 130 can be 2, 3, 4, 5, 6, 7, or more.

Each support element 130 can include a multimorph material movable in response to an electric signal (e.g., current or voltage) from the electrical source or a temperature change. The multimorph material can comprise at least two layers of material, each having a different coefficients of thermal expansion. In some cases, these layers can produce a displacement via thermal activation: a temperature change can cause one layer to expand more than the other and cause the support element 130 to bend or flex. In other cases, these layers can produce a displacement via electrical activation: electric field can cause one layer to extend and the other layer to contract. In accordance with some embodiments of the invention, the multimorph material of each support element 130 can comprise a first layer comprising polysilicon, and a second layer comprising gold, wherein the second layer is disposed on top of the first layer. An adhesion layer can be disposed between the first layer and the second layer. The use of an adhesion layer for metal deposition on a semiconducting material is known in the art. The adhesion layer can comprise chromium or titanium. The thickness of the adhesion layer can be in the range of 1 nm to tens of nanometers.

A multimorph or multimorph material can comprise two or more materials that have different coefficients of thermal expansion. Accordingly, a multimorph or multimorph material can comprise 2, 3, 4, 5, or more materials. The two or more materials in a multimorph can be layered. In general, metals have larger coefficients of thermal expansion than semiconductors. Plastics/polymers also have larger coefficients of thermal expansion than semiconductors. Non-limiting examples of multimorphs or multimorph materials include any combination of semiconductors and metals, a combination of silicon and silicon oxide, and a combination of semiconductors, polymers, and plastics. In accordance with some embodiments of the invention, the multimorph is a bimorph (i.e. two materials that have different coefficients of thermal expansion).

The length of each support element 130 can be in the range of 1 μm (or less) to 1500 μm (or more), e.g., 10 μm to 1250 μm, 100 μm to 1000 μm, 250 μm to 750 μm. The length of the support element 130 can be selected to accommodate the desired tip and/or tilt angles as well as the desired elevation range.

In accordance with some embodiments of the invention, each support element 130 can further include a heating element adapted to heat up the support element 130. The heating element can heat up the support element 130 through photon-induced or electron-induced heating. Exemplary heating elements include, but are not limited to, a laser chip, a heating coil, an induction heater, and a cathode ray tube. The magnitude of temperature change required to actuate the support element 130 depends on the particular multimorph material included in the support element 130. For a multimorph material including gold and polysilicon, actuation can occur when the temperature is raised to within a range from 100° C. to 300° C. (e.g., about 200° C.). The temperature can be lower or higher than 100° C.-300° C. depending on the properties of the particular multimorph materials included in the support element 130.

In accordance with some embodiments of the invention, each support element 130 can also be actuated through an electrostatic control. An electrostatic force can be generated between two conducting plates (e.g., metal plates) upon the application of a voltage difference (V) between the two plates. The magnitude of the electrostatic force is known to be proportional to $V^2$. For example, a polysilicon pad can be positioned below each support element 130 and directly on the base substrate 110. A potential difference applied between the polysilicon pad and the support element 130 can result in a force between the two structures and the support element 130 can be pulled toward the polysilicon pad attached to base the substrate 110.

In accordance with some embodiments of the invention, each support element 130 can be actuated by electromagnetic control. An electromagnetic force can be generated by a magnetic coil and a magnet, such that the application of a current induces a magnetic field that moves the coil relative to the magnet. For example, a magnet can be mounted to the base substrate 110 and the platform can be coupled to a coil positioned adjacent the magnet such that energizing the coil causes the coil and the platform to move vertically, away from the substrate 100. Optionally, a spring or similar mechanism can be used to limit the coil movement and bias or pull the platform back toward the substrate when the coil is not active.

The support element 130 can have an inlet for an electrical current to flow in, and an outlet for the electrical current to flow out after it passes through at least a portion of the support element 130. FIG. 2 shows the support element 130 in accordance with some embodiments of the invention. As shown in FIG. 2, the support element 130 can comprise a first end 210 and a second end 220. The first end 210 can be mounted on the base substrate and the second end 220 can be suspended over the base substrate. The first end 210 can further comprise a first electrode 212 and a second electrode 214. When connected to an electrical source, the first electrode 212 can serve as a current inlet and the second electrode 214 can serve as a current outlet, or vice versa, allowing an electrical current to flow through the support element 130. When the current has sufficient magnitude, the current can actuate the support element 130 by heating up the support element 130 above a threshold temperature.

In accordance with some embodiments of the invention, the device 100 can further comprise a plurality of spring elements 150 (e.g., 2, 3, 4, 5, 6, 7, or more). The plurality of spring elements 150 can be suspended over the base substrate 110. Each spring element 150 can comprise a first end 152 and a second end 154. The first end 152 of each spring element 150 can be connected to the second end 134 of each support element 130. The second end 154 of each spring element 150 can be connected to the platform 120. Each spring element 150 can be flexible and/or stretchable. The plurality of spring elements 150 is adapted to bend, extend, or twist to allow the platform 120 and the micromirror 140 disposed thereon to tip or tilt to large angles. In addition, the plurality of spring elements 150 can serve as heating elements for the platform 120. To serve as heating elements, the plurality of spring elements 150 can include a material having sufficient electrical resistivity to produce heat through joule heating. Each spring element 150 can have a shape that allows it to bend, extend, or twist. In accordance with some embodiments of the invention, each spring element 150 can include a serpentine or coil shaped portion. In accordance with some embodiments of the invention, each spring element 150 can include a fractal shaped or repeating geometric shaped portion. Each spring element 150 can be composed of a plurality of turns (e.g., 2, 3, 4, 5, 6, or more). The length of each spring element 150 at a relaxed state can be 10 μm-300 μm, e.g., 10 μm-200 μm, or 10 μm-100 μm.

A variety of materials can be used for the spring elements 150. Each spring element 150 can comprise a semiconductor (either doped or undoped) or a metal. For a metal to work, it would typically need to be an alloy because generally pure metals are soft because the dislocation lines can move easily. However by alloying (adding a few percent of something else) most metals can be made tough and springy. For example, pure iron is soft but adding a few percent of carbon can make it strong and tough. A few metals such as tungsten can work as spring elements even as pure metals. In accordance with some embodiments of the invention, each spring element 150 can include polysilicon.

The platform 120 is adapted to be a support on which the micromirror 140 rests. The platform 120 can be connected to the micromirror 140, for example, at the center of the micromirror 140. The connection can be formed as a result of an etching process, such that the platform 120 and micromirror 140 can be connected by the remaining material that is not etched away during the etching process. Hence, actuation of the support elements 130 can move the platform 120 and the micromirror 140 mounted thereon. In accordance with some embodiments of the invention, the platform 120 and the micromirror 140 can tip along a first axis. In accordance with some embodiments of the invention, the platform 120 and the micromirror 140 can tilt along a second axis. In accordance with some embodiments of the invention, the platform 120 and the micromirror 140 can elevate away from the base substrate 110.

In addition, the platform 120 is adapted to act as a thermal contact for the micromirror 140 by transferring heat generated in at least one of the plurality of spring elements 150 to the micromirror 140. When a current of sufficient magnitude is flowing through the plurality of spring elements 150, the plurality of spring elements 150 can heat up, which in turn can heat up the platform 120. The heated platform 120 can in turn heat up the micromirror 140, causing the micromirror 140 to change its focal length. In accordance with some embodiments of the invention, the micromirror 140 can change from a flat configuration to a curved configuration, or vice versa (e.g., FIG. 10A & FIGS. 26C-26D), in response to a temperature change. The micromirror 140 can also change from a convex configuration to a concave configuration, or vice versa, in response to a temperature change.

Instead of using the spring elements 150 as a heat source, in accordance with some embodiments of the invention, the device 100 can further comprise a heating element positioned on or below the platform 120. The heating element can provide heat to the platform 120 and/or micromirror 140. Exemplary heating elements include, but are not limited to, a laser chip, a heating coil, an induction heater, and a cathode ray tube.

The platform 120 can be of any shape such as, without limitation, circular, oval, square, rectangular, pentagonal, hexagonal, or irregular shape. The platform 120 can also include at least one cutout (e.g., 1, 2, 3, 4, 5, 6, or more) having any shape such as, without limitation, circular, oval, square, rectangular, pentagonal, hexagonal, or irregular shape. The thickness of the platform 120 can be in the range of 100 nm to 10 µm, such as 1 µm to 5 µm, or 1 µm to 3 µm. The platform 120 can comprise a semiconductor or metal. In accordance with some embodiments of the invention, the platform 120 can include polysilicon. In accordance with some embodiments of the invention, the platform 120 can include single crystalline silicon. In accordance with some embodiments of the invention, the rim of the platform 120 can be at least partially coated by a metal (e.g., gold, silver, copper, aluminum, or alloy) to aid in optical reflectivity and prevent optically heating the platform unintentionally. The platform 120 can have a thickness in the range of about 0.1 µm-10 µm.

The micromirror 140 can have a reflective surface 142 facing away from the base substrate 110. The reflective surface 142 can reflect electromagnetic irradiation (e.g., light) impinging on the surface 142. The reflective surface 142 can include a reflective material or structure or coating. The reflective material or structure can be selected to have the desired reflectivity for the particular wavelength of interest. Metals can be used as the reflective material. The reflective structure can be a dielectric mirror which can include alternating layers of dielectric materials. Dielectric mirrors are useful because their optical characteristics can be precisely engineered. In accordance with some embodiments of the invention, the micromirror 140 can comprise a silicon layer and a dielectric mirror disposed thereon, wherein the dielectric mirror can comprise alternating layers of dielectric materials having different coefficients of thermal expansion. Examples of dielectric materials include, but are not limited to, porcelain (ceramic), mica, glass, plastics, and the oxides of various metals. The micromirror 140 can have any shape such as, without limitation, circular, oval, square, rectangular, pentagonal, or hexagonal shape.

In accordance with some embodiments of the invention, the reflective surface 142 can further comprise at least one phosphor material or fluorescence material. For example, the at least one phosphor material can be used to convert light incident on the micromirror to broad spectrum white light. In accordance with some embodiments of the invention, the micromirror can redirect light towards a phosphor material that is distant from the micromirror. Examples of phosphor materials are shown in Table 1.

TABLE 1

Standard phosphor types

| Phosphor composition | color |
|---|---|
| $Zn_2SiO_4$:Mn (Willemite) | Green |
| ZnS:Cu(Ag)(B*) | Blue-Green |
| $Zn_8$:$BeSi_5O_{19}$:Mn | Yellow |
| ZnS:Ag + (Zn,Cd)S:Ag | White |
| ZnS:Ag + ZnS:Cu + $Y_2O_2S$:Eu | White |
| ZnO:Zn | Green |
| (Zn,Cd)S:Cu | Blue with Yellow persistence |
| KCl | green-absorbing scotophor |
| ZnS:Ag,Cl or ZnS:Zn | Blue |
| Zn(Mg)$F_2$:Mn | Orange |
| ZnO:Zn | Blue-Green |
| (KF,Mg$F_2$):Mn | Orange-Yellow |
| (Zn,Cd)S:Ag or (Zn,Cd)S:Cu | Yellow-green |
| $Y_2O_2S$:Eu + $Fe_2O_3$ | Red |
| ZnS:Cu,Al | Green |
| ZnS:Ag + Co-on-$Al_2O_3$ | Blue |
| (KF,Mg$F_2$):Mn | Orange |
| (Zn,Cd)S:Cu,Cl | Yellow |
| ZnS:Cu or ZnS:Cu,Ag | Yellowish-green |
| Mg$F_2$:Mn | Orange |
| (Zn,Mg)$F_2$:Mn | Orange-Yellow |
| $Zn_2SiO_4$:Mn,As | Green |
| ZnS:Ag + (Zn,Cd)S:Cu | White |
| $Gd_2O_2S$:Tb | Yellow-green |
| $Y_2O_2S$:Tb | White |
| $Y_3Al_5O_{12}$:Ce | Green |
| $Y_2SiO_5$:Ce | Blue |
| $Y_3Al_5O_{12}$:Tb | Yellow-green |
| ZnS:Ag,Al | Blue |
| ZnS:Ag | Blue |
| ZnS:Cu,Al or ZnS:Cu,Au,Al | Green |
| (Zn,Cd)S:Cu,Cl + (Zn,Cd)S:Ag,Cl | White |
| $Y_2SiO_5$:Tb | Green |
| $Y_2OS$:Tb | Green |
| $Y_3(Al,Ga)_5O_{12}$:Ce | Green |
| $Y_3(Al,Ga)_5O_{12}$:Tb | Yellow-green |
| $InBO_3$:Tb | Yellow-green |
| $InBO_3$:Eu | Yellow |
| $InBO_3$:Tb + $InBO_3$:Eu | amber |
| $InBO_3$:Tb + $InBO_3$:Eu + ZnS:Ag | White |
| (Ba,Eu)$Mg_2Al_{16}O_{27}$ | Blue |
| (Ce,Tb)$MgAl_{11}O_{19}$ | Green |
| $BaMgAl_{10}O_{17}$:Eu,Mn | Blue |
| $BaMg_2Al_{16}O_{27}$:Eu(II) | Blue |
| $BaMgAl_{10}O_{17}$:Eu,Mn | Blue-Green |
| $BaMg_2Al_{16}O_{27}$:Eu(II),Mn(II) | Blue-Green |
| $Ce_{0.67}Tb_{0.33}MgAl_{11}O_{19}$:Ce,Tb | Green |
| $Zn_2SiO_4$:Mn,$Sb_2O_3$ | Green |
| $CaSiO_3$:Pb,Mn | Orange-Pink |
| $CaWO_4$ (Scheelite) | Blue |
| $CaWO_4$:Pb | Blue |
| $MgWO_4$ | Blue pale |
| (Sr,Eu,Ba,Ca)$_5$(PO$_4$)$_3$Cl | Blue |

TABLE 1-continued

Standard phosphor types

| Phosphor composition | color |
|---|---|
| $Sr_5Cl(PO_4)_3$:Eu(II) | Blue |
| $(Ca,Sr,Ba)_3(PO_4)_2Cl_2$:Eu | Blue |
| $(Sr,Ca,Ba)_{10}(PO_4)_6Cl_2$:Eu | Blue |
| $Sr_2P_2O_7$:Sn(II) | Blue |
| $Sr_6P_5BO_{20}$:Eu | Blue-Green |
| $Ca_5F(PO_4)_3$:Sb | Blue |
| $(Ba,Ti)_2P_2O_7$:Ti | Blue-Green |
| $3Sr_3(PO_4)_2 \cdot SrF_2$:Sb,Mn | Blue |
| $Sr_5F(PO_4)_3$:Sb,Mn | Blue-Green |
| $Sr_5F(PO_4)_3$:Sb,Mn | Blue-Green |
| $LaPO_4$:Ce,Tb | Green |
| $(La,Ce,Tb)PO_4$ | Green |
| $(La,Ce,Tb)PO_4$:Ce,Tb | Green |
| $Ca_3(PO_4)_2 \cdot CaF_2$:Ce,Mn | Yellow |
| $(Ca,Zn,Mg)_3(PO_4)_2$:Sn | Orange-Pink |
| $(Zn,Sr)_3(PO_4)_2$:Mn | Orange-Red |
| $(Sr,Mg)_3(PO_4)_2$:Sn | Orange-Pinkish White |
| $(Sr,Mg)_3(PO_4)_2$:Sn(II) | Orange-Red |
| $Ca_5F(PO_4)_3$:Sb,Mn | 3800K |
| $Ca_5(F,Cl)(PO_4)_3$:Sb,Mn | White-Cold/Warm |
| $(Y,Eu)_2O_3$ | Red |
| $Y_2O_3$:Eu(III) | Red |
| $Mg_4(F)GeO_6$:Mn | Red |
| $Mg_4(F)(Ge,Sn)O_6$:Mn | Red |
| $Y(P,V)O_4$:Eu | Orange-Red |
| $YVO_4$:Eu | Orange-Red |
| $Y_2O_2S$:Eu | Red |
| $3.5 \text{ MgO} \cdot 0.5 \text{ MgF}_2 \cdot GeO_2$:Mn | Red |
| $Mg_5As_2O_{11}$:Mn | Red |
| $SrAl_2O_7$:Pb | Ultraviolet |
| $LaMgAl_{11}O_{19}$:Ce | Ultraviolet |
| $LaPO_4$:Ce | Ultraviolet |
| $SrAl_{12}O_{19}$:Ce | Ultraviolet |
| $BaSi_2O_5$:Pb | Ultraviolet |
| $SrFB_2O_3$:Eu(II) | Ultraviolet |
| $SrB_4O_7$:Eu | Ultraviolet |
| $Sr_2MgSi_2O_7$:Pb | Ultraviolet |
| $MgGa_2O_4$:Mn(II) | Blue-Green |

FIG. 3 which shows a top view of the micromirror 140 in accordance with some embodiments of the invention. The micromirror 140 can comprise one or a plurality of segments 310 (e.g., 2, 3, 4, 5, 6, 7, 8, or more). By dividing the micromirror 140 into a plurality of segments 310, the variable focus range of the micromirror 140 can be increased as the mechanical stress at a curved configuration can be reduced. The plurality of segments 310 can be substantially disconnected from each other. For example, the plurality of segments 310 can connect with each other at the center of the micromirror 140. This segmentation permits each segment 310 of the micromirror 140 to change from a flat configuration to a curved configuration without incurring serious mechanical stress. In accordance with some embodiments of the invention, each segment 310 can comprise a plurality of holes (e.g., 2, 3, 4, 5, 6, 7, 8, or more). The plurality of holes can be used during the manufacturing process to reduce etch time.

The focal length of the micromirror 140 can be changed thermally, electrothermally, capacitively or magnetically. As described above, having a heating element on or below the platform can change the focal length of the micromirror 140 thermally. The amount of temperature change required to actuate the micromirror 140 depends on the particular multimorph material included in the micromirror 140. For a multimorph material including gold and polysilicon, actuation can occur when the temperature is raised to within a range from 100° C. to 300° C. (e.g., about 200° C.). The temperature can be lower or higher than 100° C.-300° C. depending on the properties of particular multimorph material included in the micromirror 140.

To change the focal length of the micromirror 140 electrothermally, each segment 310 can include a multimorph material movable in response to an electrical signal or a temperature change. In accordance with some embodiments of the invention, the multimorph material of each segment 310 can comprise a first layer including a semiconductor material (e.g., polysilicon or single crystalline silicon), and a second layer including a metal (e.g., gold, silver, copper, aluminum, or any other reflecting metal), wherein the second layer is disposed on top of the first layer. The second layer can be reflective as a result of the metal. An adhesion layer can be disposed between the first layer and the second layer. The adhesion layer can comprise chromium or titanium. The thickness of the adhesion layer can be in the range of 1 nm to tens of nanometers.

To change the focal length of the micromirror 140 magnetically, each segment 310 can include a magnetic material. Non-limiting examples of magnetic materials include permanent magnetic materials, ferromagnetic materials, ferrimagnetic materials, superconducting materials and combinations thereof. The micromirror 140 can thus change its focal length in response to a magnetic field (e.g., a current induced magnetic field such as a direct current magnetic field).

Also shown in FIG. 3 are a first axis 320 and a second axis 322. In accordance with some embodiments, upon actuation, the micromirror 140 can tip along the first axis 320. In accordance with some embodiments, upon actuation, the micromirror 140 can tilt along the second axis 322. The first axis 320 and the second axis 322 can be orthogonal to each other.

It should be noted that the silicon mentioned throughout this application can be either doped silicon or undoped silicon. Accordingly, polysilicon can be either doped polysilicon or undoped polysilicon; single crystalline silicon can be either doped single crystalline silicon or undoped single crystalline silicon.

The electrical source(s) of the device 100 can be coupled to a control unit. The control unit is adapted to control the amount of electrical signal (e.g., voltage or current) applied to a particular support element. The control unit can be operated manually. The control unit can also include a program that permits automated operation of the device 100. The control unit can include a computer or microprocessor and associated memory (e.g., volatile and/or non-volatile memory) for storing programs that can be used to separately control the electrical signals to each support element. The signals can be controlled to control their amplitude (e.g., voltage and/or current) as well as use pulse width modulation to control the duration of the signal. The pulse width of the signal can be modulated to account for heat dissipation and optimized to achieve response times on the order 1 ms or less.

Figure 35:
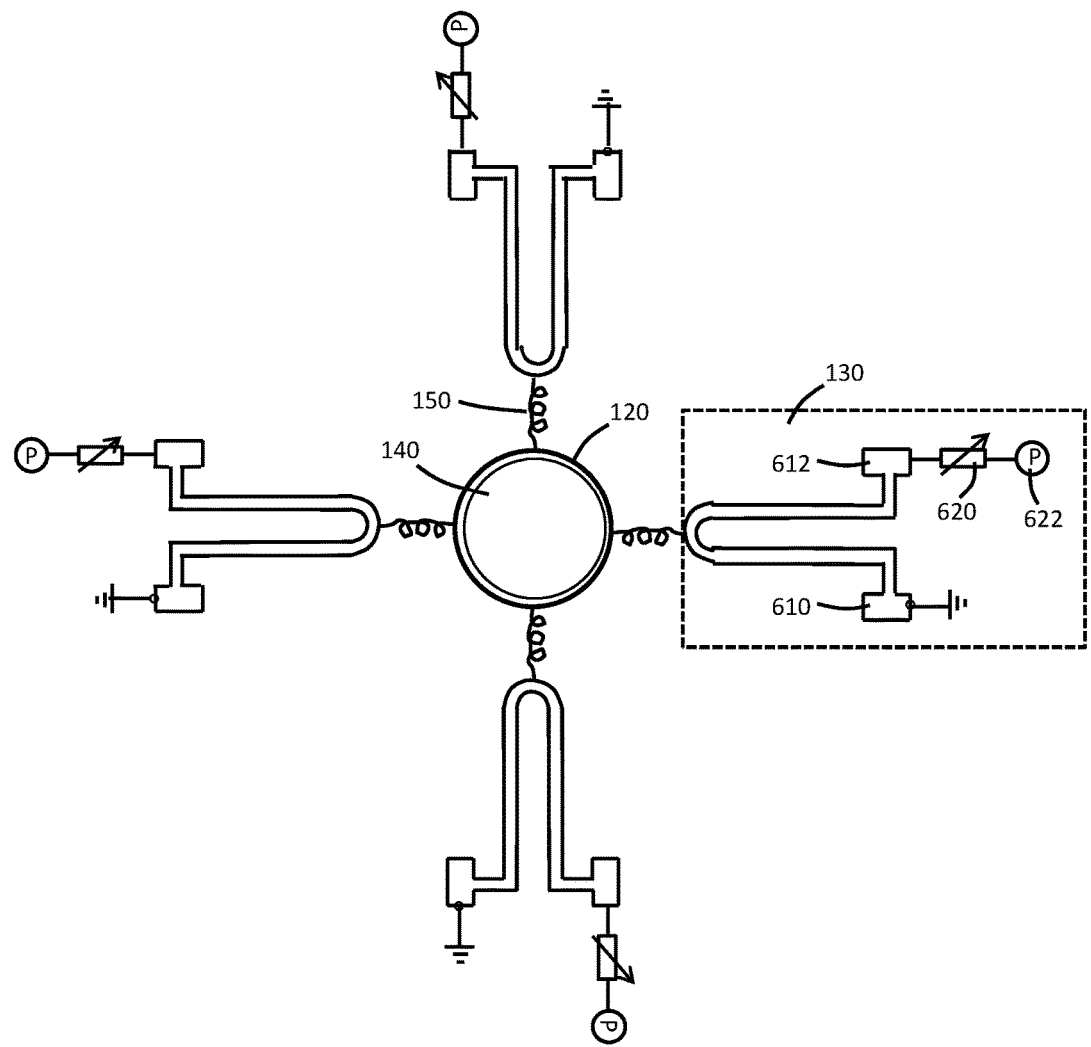
FIG. 35 is a circuit diagram for the device comprising a micromirror, 4 multimorph support elements, and 4 spring elements in accordance with some embodiments of the invention.
Figure 36:
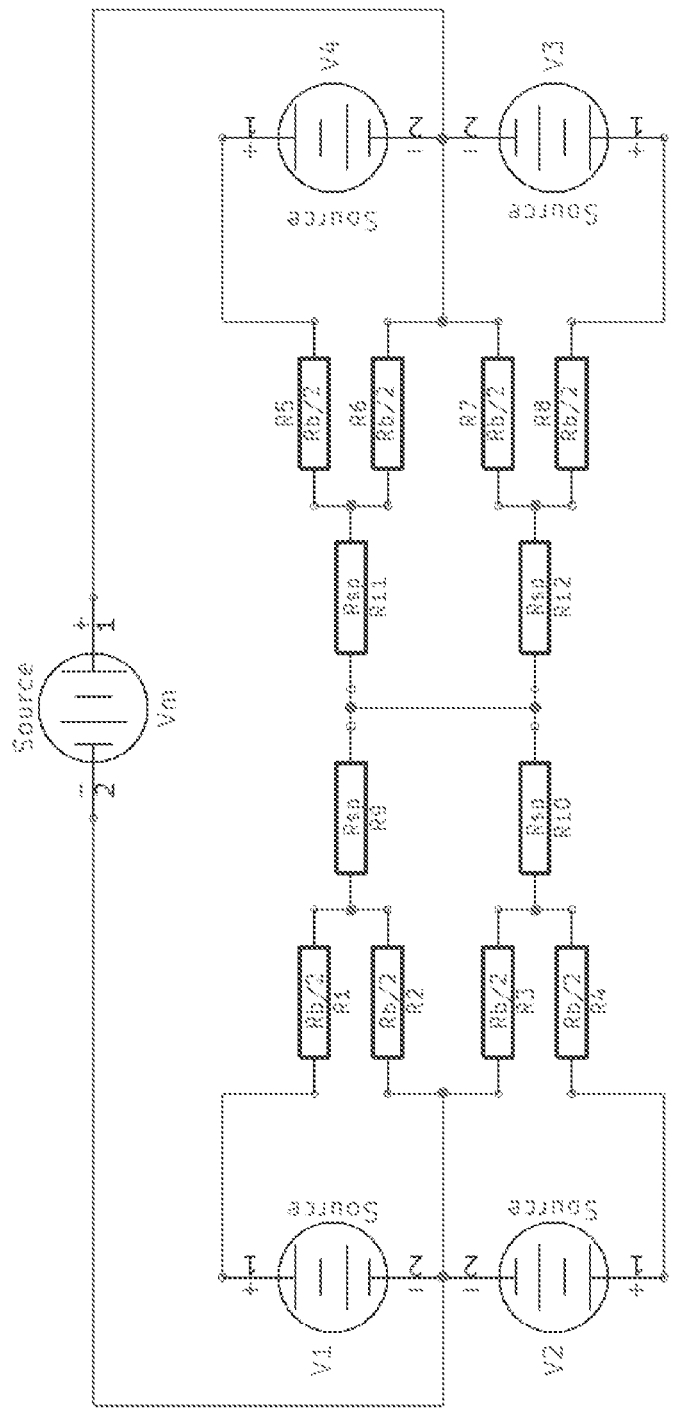
FIG. 36 is a circuit diagram for the device comprising a micromirror, 4 multimorph support elements, and 4 spring elements in accordance with some embodiments of the invention.

The operation of the device can cause actuation of at least one of the plurality of the support elements and/or at least one of the plurality of segments of the micromirror. FIGS. 35-36 are circuit diagrams for the device comprising a micromirror, four multimorph support elements, and four spring elements in accordance with some embodiments of the invention.

As shown in FIG. 35, each support element 130 can have a first electrode 610 connected to the ground and a second electrode 612 connected to an adjustable power source (e.g., a rheostat 620 and a power source 622). A voltage difference applied between the first electrode 610 and second electrode 612 by the power source 622 can result in an electrical current flowing through the support element 130, heating up the support element 130 due to Joule heating. Tipping or tilting the platform and micromirror can occur when the temperature of the support element 130 reaches or exceeds a threshold temperature. A voltage difference can also be applied between two support elements 130 by the power sources, each of which can be connected through the platform 120 and spring elements 150 to one or more of the other support elements 130. An electrical current can thus flow from one support element 130 to another, heating up the spring elements 150 along the flow of the electrical current. The heated spring elements 150 can heat up the platform 120 and micromirror 140, leading to a change in the focal length and curvature of the micromirror 140.

As shown in FIG. 36, each support element can be connected to an electrical source, allowing each support element to be actuated independently; a separate electrical source ($V_m$) can be used to apply an electrical signal between any two support elements.

The movement of the support elements and micromirror can be controlled by the application of an electrical signal (e.g., electrical current or potential) from the electrical source, and can produce a variety of actuation modes for the micromirror. The actuation modes for the micromirror include, but are not limited to, tipping along a first axis, tilting along a second axis, elevating the platform away from the base substrate (also referred to as the piston mode), changing the micromirror curvature (also referred to as the varifocal mode), and any combinations thereof. Said tipping or tilting permits the micromirror to reflect an incoming electromagnetic wave (e.g., visible light) towards a desirable direction. Said tipping or tilting can be achieved by actuating one of the support elements (e.g., applying an electrical current to one of the support elements). When an electrical current is applied to one of the support elements, the one of the support elements can heat up due to Joule heating. The micromirror can tip or tilt over a wide range. For example, the mechanical range of said tipping or tilting can be from about −25° to 25° or more, from about −20° to 20°, from about −15° to 15°, or from about −10° to 10° or less. The range of optical deflection is twice the mechanical range. During said tipping or tilting, the focal length of the micromirror can remain unchanged.

The platform and micromirror can be elevated (or dropped) with respect to the base substrate when all the support elements are actuated. Stated another way, the spacing between the platform and the base substrate can be increased (or decreased) when all the support elements are actuated. Said elevation can be achieved by applying an electrical signal to all the support elements. The maximum increase of said spacing can depend on the length, composition, and thermal annealing procedure of the supporting elements. In accordance with some embodiments of the invention, the maximum increase of said spacing can be about 100 μm or less. In accordance with some embodiments of the invention, the maximum increase of said spacing can be about 200 μm or more. In accordance with some embodiments of the invention, the maximum increase of said spacing can be about 300 μm or more. In accordance with some embodiments of the invention, the maximum increase of said spacing can be about 400 μm or more. In accordance with some embodiments of the invention, the maximum increase of said spacing can be about 500 μm or more. In accordance with some embodiments of the invention, the maximum increase of said spacing can be about 1000 μm or more.

The curvature of the micromirror can also be changed through electrothermal actuation. For example, the micromirror can be changed from a curved configuration (e.g., concave) to a substantially flat configuration, or vice versa. In another example, the micromirror can be changed from concave to convex, or vice versa. The change in micromirror curvature can be achieved by applying an electrical signal between any of two support elements. When at least one spring element is heated up, e.g., due to Joule heating, a portion of the heat can be transferred to the platform through heat transfer, thereby heating up the platform, which in turn can heat up the micromirror. The micromirror can change its curvature in response to the change in temperature. Due to the difference in material composition, each spring element can have larger electrical resistivity than each support element. This impedance mismatch between the spring elements and support elements allows for decoupling of the focal electrothermal actuation and deflection electrothermal actuation. Each support element can have a size sufficient to create a thermal barrier through which heat due to actuation of the bimorph legs is impeded from heating up the platform. The current required to heat up each spring element is significantly smaller than that required to heat up each support element.

The range of change in the focal length of the micromirror can depend on factors such as thermal annealing procedure, composition of the multimorph material, number of micromirror segments, and placement of holes in the micromirror. In accordance with some embodiments of the invention, the focal length of the micromirror can change from about −0.48 mm to 20.5 mm.

In accordance with some embodiments of the invention, the device can operate in a scanning mode, e.g., raster scanning. The frequency of the scanning mode can depend on the response time of the multimorph material used in the device.

The device described herein can be fabricated using standard methods for making MEMS. These standard methods include processing in a cleanroom. For example, the device can be fabricated using a Multi-User MEMS Process (MUMPS) known as PolyMUMPs by MEMSCAP. See D. Koester, A. Cowen, and R. Mahadevan, "PolyMUMPs design handbook," at http://www.memscap.com/products/mumps/polymumps/reference-material, the contents of which are incorporated herein by reference. In one embodiment, the fabrication can include three highly doped polysilicon layers, two sacrificial oxide layers, and a gold layer patterned using optical or electron-beam lithography.

One related aspect of the invention relates to a system comprising at least one device as described herein having a micromirror and at least one light source. The micromirror of the device can receive light from the light source and manipulate the reflected light for a variety of applications. In accordance with some embodiments of the invention, the system can comprise an array of devices as described herein (e.g., 2, 3, 4, 5, 6, 7, 8, or more) and one light source. The array of devices can receive light from the light source and manipulate the reflected light independently. In accordance with some embodiments of the invention, the system can comprise an array of devices as described herein (e.g., 2, 3, 4, 5, 6, 7, 8, or more) and an array of light sources (e.g., 2, 3, 4, 5, 6, 7, 8, or more). In accordance with some embodiments of the invention, the system can comprise a single device as described herein and an array of light sources (e.g., 2, 3, 4, 5, 6, 7, 8, or more). The device can receive light from the array of light sources simultaneously or sequentially. For example, color mixing can be done in such configuration.

The array of devices or light sources can be arranged in a pattern. The pattern can be geometric, random or ordered. Each of the light sources of the array can emit light having the same or different wavelength(s).

The system can further comprise one or more optical element(s) adapted to direct the light emitting from the light source to the micromirror of the device. The one or more optical element(s) can include static mirrors and/or refractive optics adapted to structure the incident light prior to impinging on the micromirror. The one or more optical element(s) can include molded plastic parts.

The system can further comprise one or more optical element(s) along the optical path of the reflected light, e.g., to enhance the illumination properties. The one or more optical element(s) can include diffusers, lenses, and mirrors.

In accordance with some embodiments of the invention, the light source can be a light-emitting diode (LED). In accordance with some embodiments of the invention, the light source can be a laser. Pulse-width modulation techniques can be used to control the intensity of the light source. In accordance with some embodiments of the invention, the light source can be directed through an optical fiber to the micromirror and/or the micromirror can direct the light into an optical fiber for transmission to a remote location. In accordance with some embodiments of the invention, the system can further comprise a control unit coupled to the device and adapted to actuate the device. The control unit can be operated manually. The control unit can also include a program that permits automated operation of the system.

FIG. 4A is a schematic of a system 400A in accordance with some embodiments of the invention. The system 400A can comprise a device 410A having a micromirror 412A described herein and a light source 420A. The light source 420A can be mounted on the micromirror 412A. For example, the light source 420A can be mounted at the center of the micromirror 412A. The system 400A can further comprise at least one optical element (e.g., lens) adapted to direct the light from the light source 420A to the micromirror 412A. Depending on the type of the light source and emission pattern of the light source, the at least one optical element can vary.

Figure 4B:
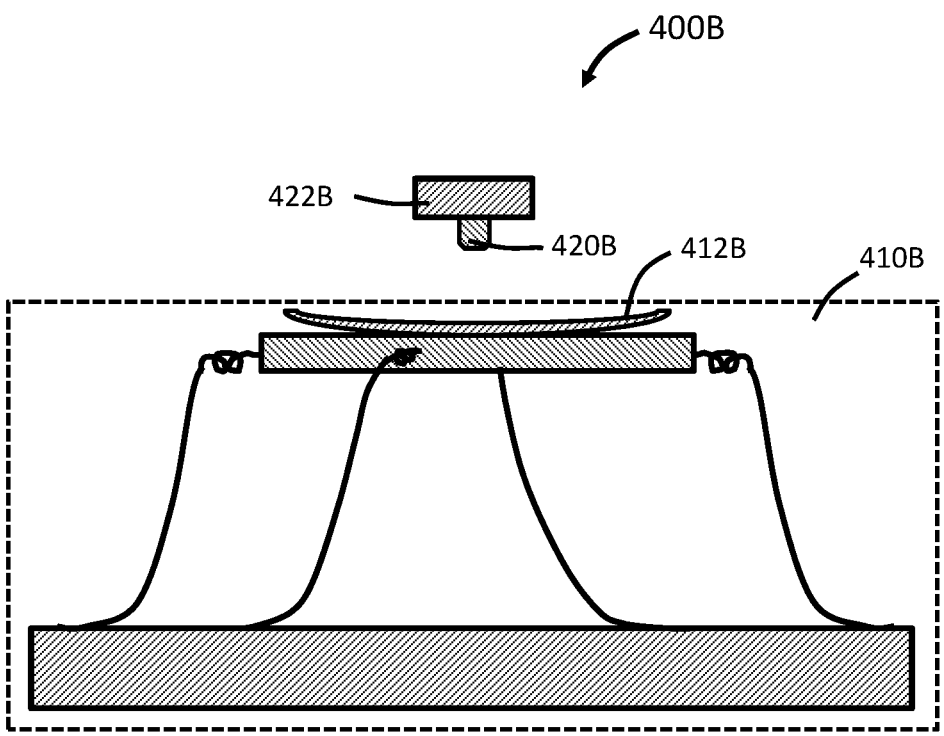
FIG. 4B is a schematic of a system 400B in accordance with some embodiments of the invention.

FIG. 4B is a schematic of a system 400B in accordance with some embodiments of the invention. The system 400B can comprise a device 410B having a micromirror 412B described herein and a light source 420B. The light source 420B can be mounted on a support 422B and suspended over the micromirror 412B. While FIG. 4B shows the light source 420B suspended over the center of the micromirror 412B, the light source 420B can be positioned off-center relative to the micromirror 412B. The system 400B can further comprise at least one optical element (e.g., lens) adapted to direct the light from the light source 420B to the micromirror 412B. Depending on the type of the light source and emission pattern of the light source, the at least one optical element can vary. The distance between the light source 420B and the micromirror 412B can be adjusted to achieve the desired outcome of reflection.

Figure 4C:
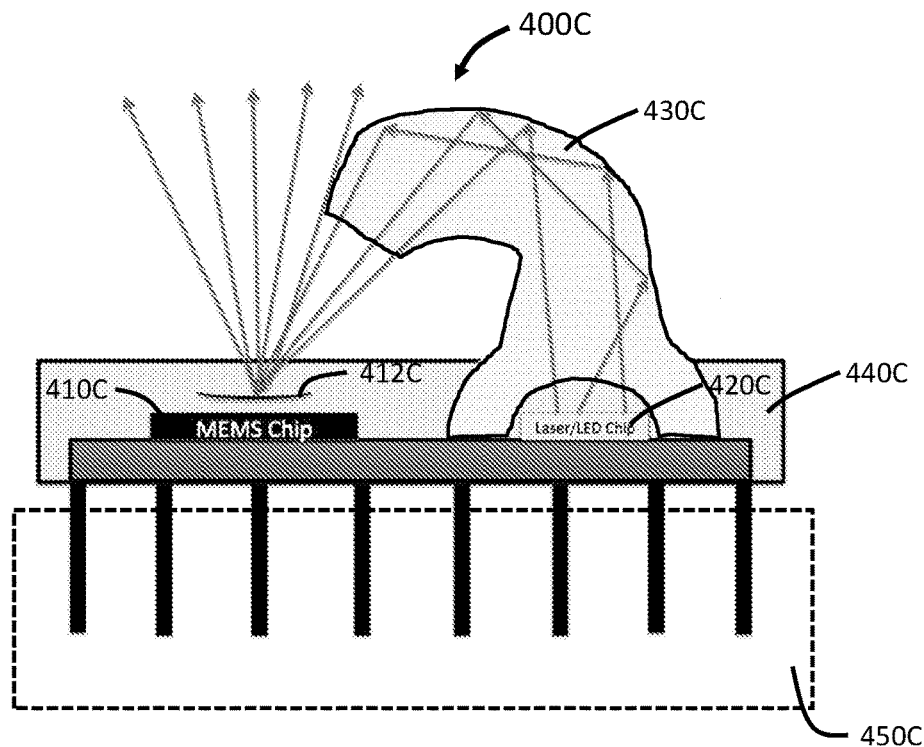
FIG. 4C is a schematic of a system 400C in accordance with some embodiments of the invention.

FIG. 4C is a schematic of a system 400C in accordance with some embodiments of the invention. The system 400C can comprise a device 410C having a micromirror 412C described herein, a light source 420C, and an optical element 430C adapted to guide the light emitting from the light source 420C towards the micromirror 412C. In accordance with some embodiments of the invention, the optical element 430C can comprise a waveguide (e.g., a plastic waveguide). In accordance with some embodiments of the invention, the optical element 430C can further comprise a series of lenses and filters. The optical element 430C can be in the form of a single piece of molded plastic. The system 400C can further comprise an enclosure 440C enclosing the device 410C, light source 420C, and optical element 430C. Also shown in FIG. 4C is the electronic component 450C adapted to drive the device 410C and light source 420C. The electronic component 450C can be positioned outside the enclosure 440C. The system 400C can further comprise a heat sink (not shown) adapted to prevent the light source 420C from overheating.

Figure 4D:
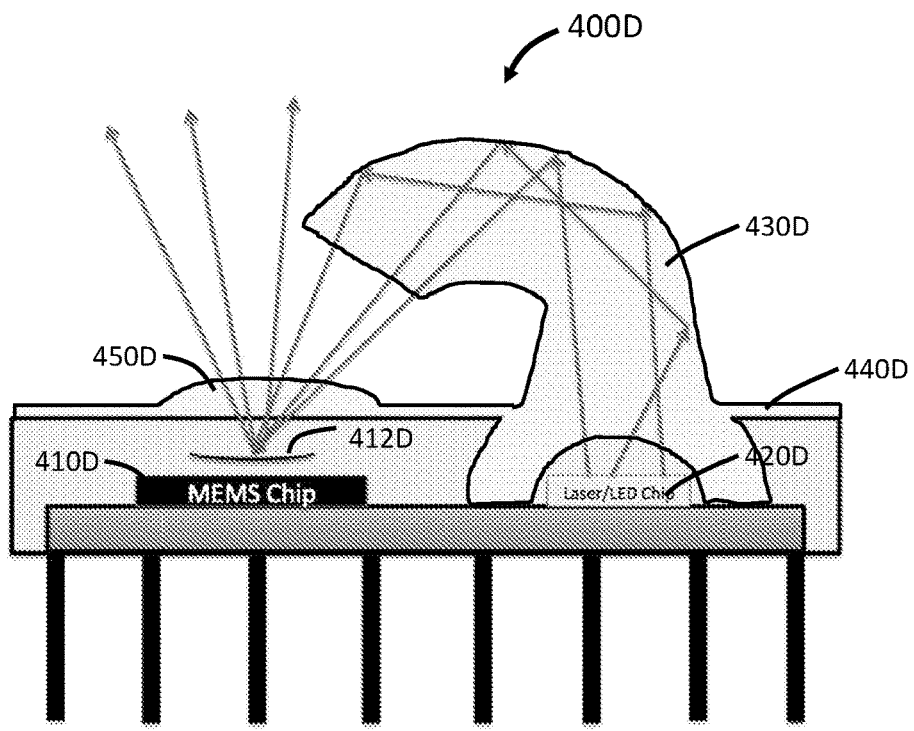
FIG. 4D is a schematic of a system 400D in accordance with some embodiments of the invention.

FIG. 4D is a schematic of a system 400D in accordance with some embodiments of the invention. The system 400D can comprise a device 410D having a micromirror 412D described herein, a light source 420D, an optical element 430D adapted to guide the light emitting from the light source 420D towards the micromirror 412D, a lid 440D, and an extraction element 450D. The lid 440D can protect the device 410D and light source 420D from being exposed to the dust. The extraction element 450D can be a refractive lens, diffusive lens, phosphor material, or any combinations thereof to act as a medium of light extraction. The optical element 430D, lid 440D, and extraction element 450D can be included in a single piece of molded plastic.

The configurations in FIGS. 4C-4D have the advantage of having all or most of the electrical wires on the same side of the system, thereby simplifying electrical connections.

Figure 5:
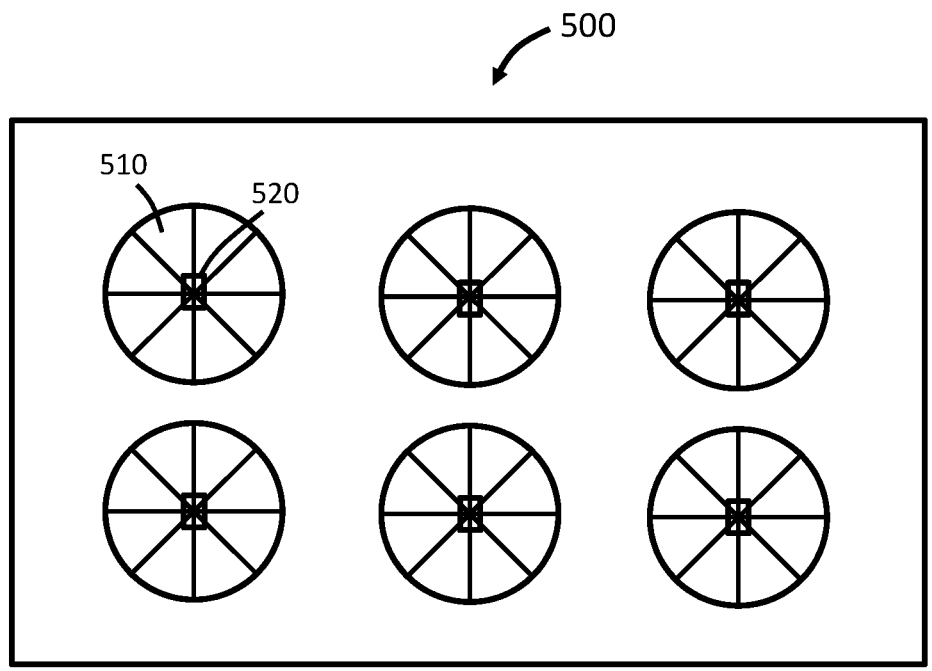
FIG. 5 shows a top view of a system 500 in accordance with some embodiments of the invention.

In accordance with some embodiments, the invention also provides a system comprising (a) an array of devices as described herein, each device having a micromirror, and (b) an array of light sources. The system can comprise 2, 3, 4, 5, 6, 7, 8, 9, 10 or more devices. The system can also comprise 2, 3, 4, 5, 6, 7, 8, 9, 10 or more light sources. An exemplary system is schematically shown in FIG. 5. FIG. 5 shows a top down view of a system 500 in accordance with some embodiments of the invention. The system 500 can comprise an array of devices 510 and an array of light sources 520. The array of devices 510 or light sources 520 can be arranged in a pattern. The pattern can be geometric, random, or ordered. In accordance with some embodiments of the invention, the system 500 can further comprise a control unit coupled to the array of devices 510 and/or array of light sources 520. The devices 510 can be controlled independently or simultaneously by the control unit. The light sources 520 can be controlled independently or simultaneously by the control unit.

The devices and systems of the invention can be used in a variety of light-steering applications. One application is in smart lighting, a non-imaging system in which MEMS can be integrated with solid state lighting to enable complete control over the flux and the chromaticity of a lighting fixture. A subset of the smart lighting applications includes MEMS in optical communication systems. The devices and systems of the invention can eliminate the need for additional optics to provide fully integrated directional light. Beam steering can provide dynamic optical wireless communications (OWC) for mobile systems while the tunable focus can be used in location algorithms to pinpoint the location of a receiver and focus on it. Micromirrors can provide a cheap and effective method of introducing chip level control of illumination in both space and time. The devices and systems of the invention, by combing all the relevant degrees of freedom into a single, low cost chip, can add this functionality to solid state lighting systems in a practical way.

Figure 6:
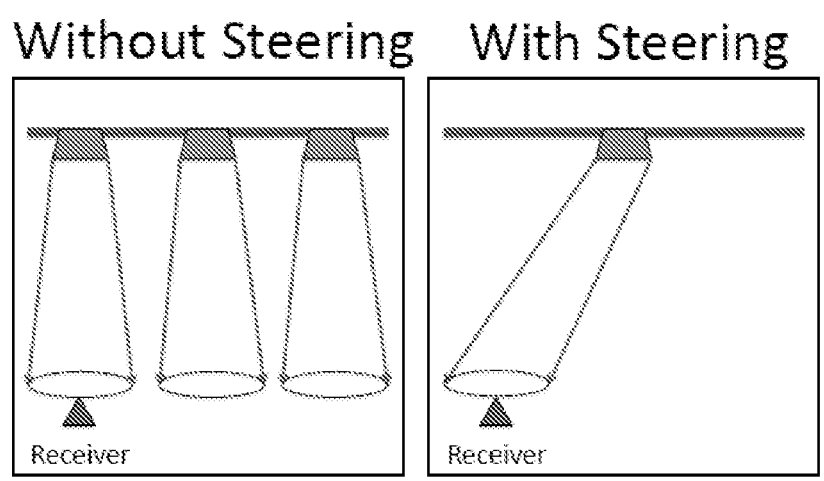
FIG. 6 is a schematic showing light communication without or with steering capabilities.

In accordance with some embodiments of the invention, the devices and systems described herein can be used in visible light communication. For example, light from a light source, which carries data or information, can be steered to a user having a receiver for receiving the reflected light, see, e.g., FIG. 6. By incorporating the MEMS micromirror devices or systems described herein, each receiver needs only one light source. Additionally, the MEMS micromirror described herein can also be dynamically focused so the beam can be both directed to the correct location and focused or defocused to the correct size. One potential application is automatic illumination in an area of a room where a person has the receiver.

For visible light communication, light can be rendered using a scanning mode in the system and incorporating a vector graphic rendering scheme with one or more sources. This can allow vector graphic representations within the illumination and can be used for communications.

In accordance with some embodiments of the invention, the devices and systems described herein can also be used to change at least one characteristic of light in a room. For example, the devices and systems described herein can be used to change at least one of: spatial distribution, intensity, color, and hue. The change can be programmed or initiated by a user. For example, the devices and systems described herein can be used to paint a room with light, wherein the intensity and color of the light can be tuned.

In accordance with some embodiments of the invention, the devices and systems described herein can also be used for light harvesting. For example, a percentage of the light from the light source can be reflected directly from the substrate and the rest can be harvested using the micromirror and dynamically controlled in both illuminance and directivity.

In any of the applications of the devices and systems described herein, the micromirrors can be dynamically actuated on time scales faster than the persistence time of the human eye so that the light does not appear to flicker to the human eye. For example, the micromirrors can be dynamically actuated on a time scale of 5 ms or less. The micromirrors can be dynamically actuated on time scales sufficiently fast to eliminate speckle which can arise when lasers are used. For example, the piston mode of the micromirrors can be utilized to de-speckle a laser beam.

It should be understood that this invention is not limited to the particular methodology, protocols, and reagents, etc., described herein and as such may vary. The terminology used herein is for the purpose of describing particular embodiments only, and is not intended to limit the scope of the present invention, which is defined solely by the claims.

As used herein and in the claims, the singular forms include the plural reference and vice versa unless the context clearly indicates otherwise. Other than in the operating examples, or where otherwise indicated, all numbers expressing quantities of ingredients or reaction conditions used herein should be understood as modified in all instances by the term "about."

Although any known methods, devices, and materials may be used in the practice or testing of the invention, the methods, devices, and materials in this regard are described herein.

Definitions

Unless stated otherwise, or implicit from context, the following terms and phrases include the meanings provided below. Unless explicitly stated otherwise, or apparent from context, the terms and phrases below do not exclude the meaning that the term or phrase has acquired in the art to which it pertains. The definitions are provided to aid in describing particular embodiments, and are not intended to limit the claimed invention, because the scope of the invention is limited only by the claims. Further, unless otherwise required by context, singular terms shall include pluralities and plural terms shall include the singular.

As used herein, the term "comprising" or "comprises" is used in reference to compositions, methods, and respective component(s) thereof, that are useful to an embodiment, yet open to the inclusion of unspecified elements, whether useful or not.

As used herein, the term "consisting essentially of" refers to those elements required for a given embodiment. The term permits the presence of elements that do not materially affect the basic and novel or functional characteristic(s) of that embodiment of the invention.

As used herein, the term "micromirror" refers to a small mirror, typically having a dimension of less than 1 mm. In accordance with some embodiments of the invention, the micromirror can be about 10 µm to 2.0 millimeters or more across.

As used herein, the term "disposed on" refers to layers disposed directly in contact with each other or indirectly by having intervening layers therebetween, unless otherwise specifically indicated.

Other than in the operating examples, or where otherwise indicated, all numbers expressing quantities of ingredients or reaction conditions used herein should be understood as modified in all instances by the term "about." The term "about" when used in connection with percentages may mean ±1% of the value being referred to. For example, about 100 means from 99 to 101.

The singular terms "a," "an," and "the" include plural referents unless context clearly indicates otherwise. Similarly, the word "or" is intended to include "and" unless the context clearly indicates otherwise.

Although methods and materials similar or equivalent to those described herein can be used in the practice or testing of this disclosure, suitable methods and materials are described below. The term "comprises" means "includes." The abbreviation, "e.g." is derived from the Latin exempli gratia, and is used herein to indicate a non-limiting example. Thus, the abbreviation "e.g." is synonymous with the term "for example."

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow. Further, to the extent not already indicated, it will be understood by those of ordinary skill in the art that any one of the various embodiments herein described and illustrated can be further modified to incorporate features shown in any of the other embodiments disclosed herein.

All patents and other publications; including literature references, issued patents, published patent applications, and co-pending patent applications; cited throughout this application are expressly incorporated herein by reference for the purpose of describing and disclosing, for example, the methodologies described in such publications that might be used in connection with the technology described herein. These publications are provided solely for their disclosure prior to the filing date of the present application. Nothing in this regard should be construed as an admission that the inventors are not entitled to antedate such disclosure by virtue of prior invention or for any other reason. All statements as to the date or representation as to the contents of these documents is based on the information available to the applicants and does not constitute any admission as to the correctness of the dates or contents of these documents.

The description of embodiments of the disclosure is not intended to be exhaustive or to limit the disclosure to the precise form disclosed. While specific embodiments of, and examples for, the disclosure are described herein for illustrative purposes, various equivalent modifications are possible within the scope of the disclosure, as those skilled in the relevant art will recognize. For example, while method steps or functions can be presented in a given order, alternative embodiments may perform functions in a different order, or functions may be performed substantially concurrently. The teachings of the disclosure provided herein can be applied to other procedures or methods as appropriate. The various embodiments described herein can be combined to provide further embodiments. Aspects of the disclosure can be modified, if necessary, to employ the compositions, functions and concepts of the above references and application to provide yet further embodiments of the disclosure.

Specific elements of any of the foregoing embodiments can be combined or substituted for elements in other embodiments. Furthermore, while advantages associated with certain embodiments of the disclosure have been described in the context of these embodiments, other embodiments may also exhibit such advantages, and not all embodiments need necessarily exhibit such advantages to fall within the scope of the disclosure.

EXAMPLES

The following examples illustrate some embodiments and aspects of the invention. It will be apparent to those skilled in the relevant art that various modifications, additions, substitutions, and the like can be performed without altering the spirit or scope of the invention, and such modifications and variations are encompassed within the scope of the invention as defined in the claims which follow. The technology described herein is further illustrated by the following examples which in no way should be construed as being further limiting.

Example 1

MEMS-Enhanced Smart Lighting

Figures 7A, 7B, 7C:
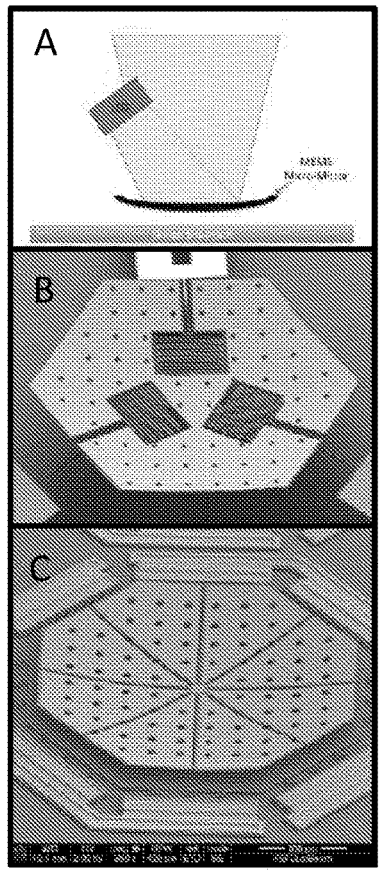
FIG. 7A is a schematic showing the coupling of a LED or laser diode chips to a MEMS micro-mirror to give one the ability to steer the beam.
FIG. 7B shows a typical MEMS micromirror that can be aimed in any direction within a cone of roughly +/−30 degrees.
FIG. 7C shows an example of a MEMS micromirror whose radius of curvature can be tuned to change the focus.

FIG. 7A is a schematic showing the coupling of a LED or laser diode chips to a MEMS micro-mirror to give one the ability to steer the beam. The MEMS micromirrors are used to dynamically redirect light in any direction. FIG. 7B shows a typical MEMS micromirror that can be aimed in any direction within a cone of roughly +/−30 degrees. FIG. 7C shows an example of a MEMS micromirror whose radius of curvature can be tuned to change the focus. Such mirrors are low cost, easily fabricated in large numbers in a commercial fab, reliable and can be actuated with only modest amounts of electrical power.

The devices shown in the FIGS. 7B-C were built in the MEMSCAP foundry using the PolyMUMPS process. This is a three layer process. In research quantities, the processed silicon can cost as little as ~$1/mm$^2$. In large volumes, the costs can drop by a factor of five to ten. For a MEMS device, the cost is unrelated to the complexity of the device. The costs are just proportional to the surface area of the die whether there is a simple device on it or a complicated one. Complexity is essentially free. The inventors also have designs that combine both beam steering and the ability to change the radius of curvature. By adjusting the currents through the legs, the radius of curvature can be tuned as well as the tilting angle. Such a device basically functions like a miniature spotlight where the light can be both aimed and focused where desired.

The device can be actuated via thermal bimorphs whose radius of curvature is controlled by the amount of power dissipated in them. Typical amounts of power needed are in the range of 50 mW per support element. In addition to being low cost and low power, MEMS devices have proven themselves to be quite reliable. The MEMS can be designed such that the devices are operated within the linear mechanical response regime so there is no failure due to material fatigue. Cycling tests of similar devices into the tens of billions of cycles have proven this. The other concern is mechanical shock and vibration. Because of their small size, the mechanical resonant frequencies are high where there is little mechanical noise. Typical mechanical noise in a room falls off as 1/f and so by the time one gets to a kHz and above, there is very little mechanical noise to worry about. The same is true of shock.

Figure 8:
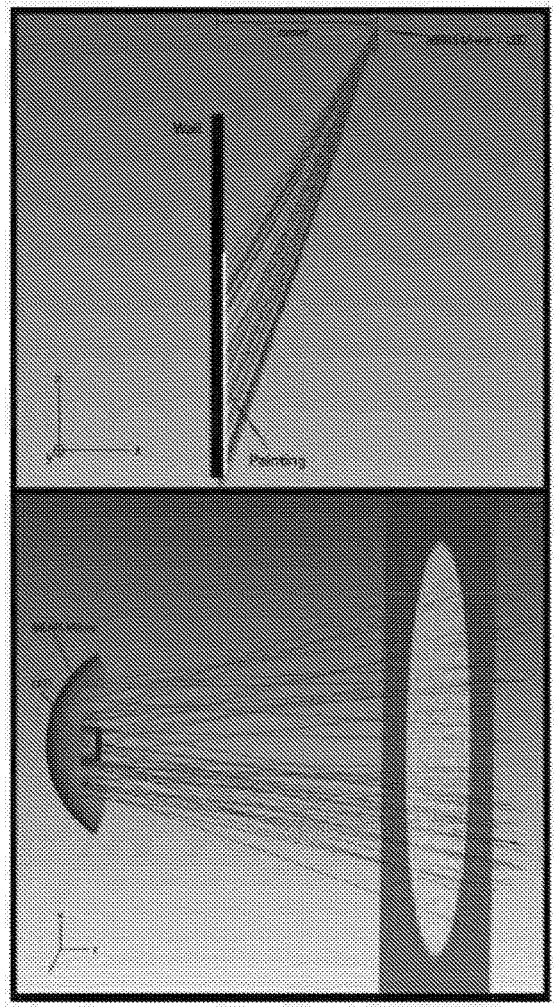
FIG. 8 shows an example of some ray-tracing simulations on the devices described herein to quantify the performance as well as how one might use it in a room.

Another advantage is speed. Because these devices are small, they can move quickly. Typical response times are in the millisecond range. Because of this, they can be used to move beams of light around on time scales faster than the persistence of a human eye and so dwell time in a particular direction can be used to adjust both intensity and color if one has a number of these with differing spectral characteristics. These devices allow one to "paint" with light. FIG. 8 shows an example of some ray-tracing simulations on the devices described herein to quantify the performance as well as how one might use it in a room.

The MEMS micromirror devices described herein are low cost, reliable, fast, have considerable functionality, easy to manufacture and therefore are something that potentially could be integrated into a solid state lighting solution in a practical way.

Example 2

Electrothermally Actuated Micromirror with Integrated Varifocal Capability

This example provides a micromirror design which incorporates electrothermal deflection for both beam steering and a variable focus. The focal length can be dynamically shifted between −0.7 mm and +17.5 mm with less than 18 mW of power. Additionally, it has an optical scanning range of up to ±30° along both lateral axes. Furthermore, by actuating all of the bimorph legs simultaneously, the mirror can be actuated in piston mode providing a fourth degree of freedom with a 150 um vertical range.

Varifocal Micromirror with Tip-Tilt-Piston Capabilities

The devices are fabricated using a Multi-User MEMS Process (MUMPs) known as PolyMUMPs by MEMSCAP [MEMSCAP, http://www.memscap.com/products/mumps/polymumps/reference-material]. The fabrication includes three highly doped polysilicon layers, two sacrificial oxide layers, and a gold layer patterned using optical lithography. The micromirror capabilities can be enabled using the electrothermal properties of gold and polysilicon thin films. Using thermal response allows for tunability of the curvature using Joule heating [W. Liu and J. J. Talghader, Current-controlled curvature of coated micromirrors, Opt. Lett. 28, 932-934 (2003)] while maintaining large deflections. As the structure is heated, the gold film experiences a greater expansion than the polysilicon resulting in a change in curvature. In accordance with some embodiments of the invention, the curvature of a bimorph structure is linearly proportional to the change in temperature of the system. Additionally, electrothermal driving depends inherently on Joule heating which is linearly dependent on the dissipated electrical power. Furthermore, the curvature of a bimorph actuator follows linearly with the dissipated power.

Figure 9A:
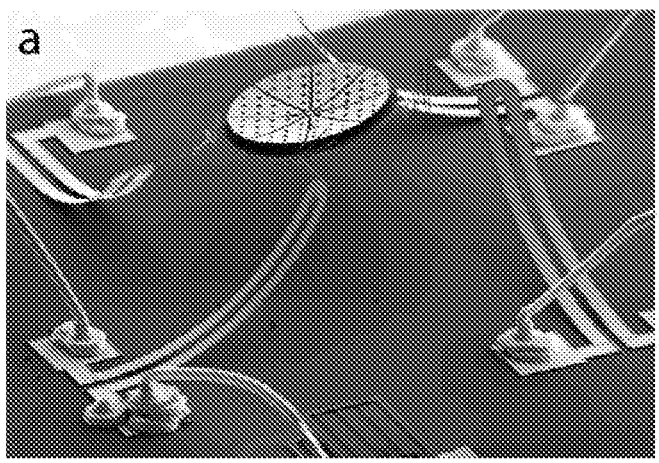
FIGS. 9A-9B are scanning electron microscope (SEM) images of the micromirror at (FIG. 9A) 60° and (FIG. 9B) from above showing the initial rotation of the central plate and bias values.
Figure 9B:
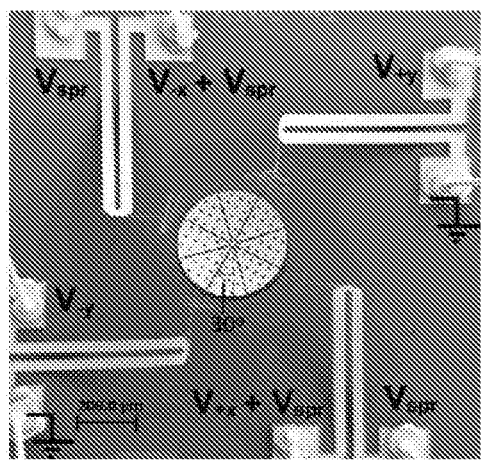

As shown in FIGS. 9A and 9B, each of the four bimorph legs can be connected (e.g., at the tip) to a serpentine (or coil) spring of small cross sectional area. The springs can be connected to a circular polysilicon plate, 400 um in diameter. As shown in FIG. 10A, a central cylinder of the polysilicon plate, consisting of polysilicon and gold, acts as the thermal contact and mechanical base of the mirror membrane. Eight thermal bimorph wedges 392 um in length extend from the central cylinder. By dividing the mirror into eight individual wedges, the bimorphs can deflect to a much greater degree than would be possible with a solid plate. The device can be tilted by applying a voltage $V_{\pm x}$ and/or $V_{\pm y}$, shown in FIGS. 9A-9B, such that only the biased bimorph legs experience Joule heating and the mirror membrane remains in its relaxed state. The piston mode is available by actuating all four legs at the same power.

By applying a voltage difference between any of the two legs, shown as $V_{spr}$ in FIG. 9B, the springs of small cross sectional experience Joule heating and, in turn, heat the circular pad and central cylinder. The central cylinder then heats the mirror bimorph wedges, flattening them from their initial curved position as depicted in FIG. 10A. This deflection is responsible for the dynamic focal length adjustment and can be actuated independently from beam steering.

An extensive study of the micromirror curvature and the resulting focal range was conducted with a Zygo NewView 6300 Interferometer. Diagrams depicting mirror curvature measurements using the interferometer are shown in FIG. 10A. The curvature was measured by fitting a sphere to the gold layer. Any spikes in the data from reflection off of the circular heating pad below the bimorphs were subtracted. Curvature measurements of the mirror membrane demonstrate a wide focal range, when the legs are left unactuated, from −0.7 0 m to +17.5 mm and can be flattened to within 230 nm. The minimum fully decoupled focal length is limited by the residual heat from actuating the bimorph legs. It is found to be −0.95 mm (−0.53 mm$^{-1}$ curvature) when all four legs are biased regardless of the initial shape of the mirror. Additionally, the curvature was the same to within less than 2.5% when two opposite legs were at $V_{spr}$ (as shown in FIG. 9B) compared to when two adjacent legs were offset at $V_{spr}$. This implies that the amount of heat migrating to the central cylinder used to heat the wedges is the same regardless of which springs are used as the source of heat. The central cylinder provides a unique advantage as any uneven heating in the pad below the wedges is inconsequential to their shape. Ultimately, the repeatability is limited by hysteresis effects due to residual heat and thermal annealing during actuation. A more detailed study on bimorph thermal cycling has been performed by Gall et al. [K. Gall, M. L. Dunn, Y. Zhang, and B. A. Corff, Thermal cycling response of layered gold/polysilicon MEMS structures, Mech. Mater. 36, 45-55 (2004)].

Figure 11:
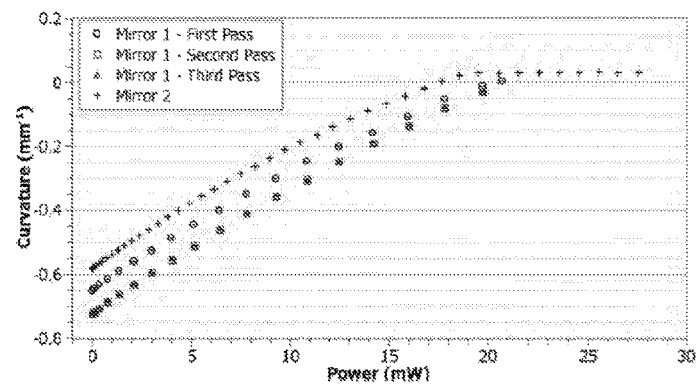
FIG. 11 is a graph showing curvature measured versus power based on a spherical fit to the gold layer.

FIG. 11 shows the curvature of two mirrors as a function of applied electrical power. The curvature when the membrane is in a relaxed state is dependent on the initial annealing procedure and can be tuned to the desired minimum focal length by altering thermal annealing times and temperatures Mirror 1 was measured in three passes immediately following one another. The shift in curvature from the first pass to the second is residual heat from cycling to high power (completely flat) and immediately back to zero power. The mirror returns to its original shape if one waits for the device to cool completely. A more detailed study regarding the relaxation time has not yet been conducted. The difference in curvature between Mirror 1 (first pass) and Mirror 2 is due to temperature variation in the initial annealing procedure.

Figure 12:
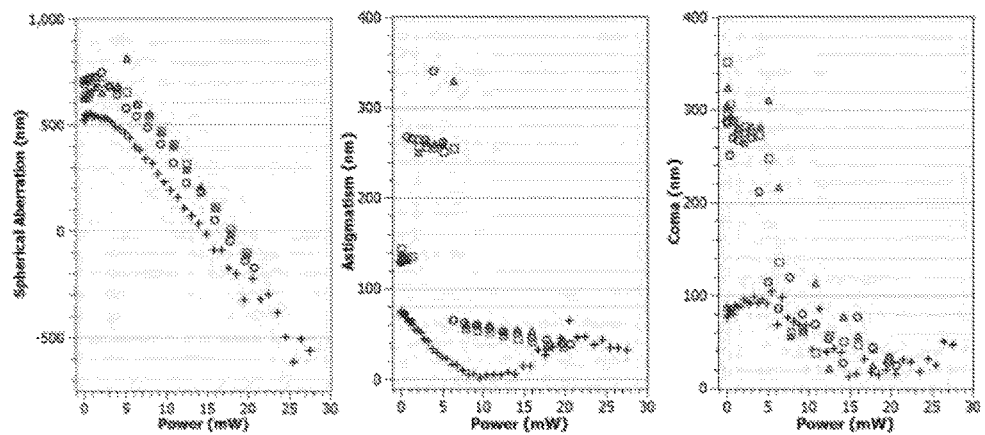
FIG. 12 is a set of graphs showing aberrations of the gold surface of the mirror from the Zernike polynomials as measured in the Zygo interferometer. The three most significant aberrations were spherical (left), astigmatism (center), and coma (right).

The upper limit on curvature is determined by the close proximity of circular plate beneath the wedges. This limit is apparent in FIG. 11 from Mirror 2 as the mirror flattens and becomes increasingly convex. Once the edges of the mirror touch the circular plate, the bimorph wedges have a secondary place from which they are heated. The most significant aberrations measured using Zernike polynomials were spherical aberration, astigmatism and coma shown in FIG. 12. The aberrations were all consistently less than 800 µm.

Electrothermal actuation can be used to produce large angle mechanical deflections in the MEMS micromirrors. Vertical (piston-mode) displacements of over 600 µm [L. Wu and H. Xie, A large vertical displacement electrothermal bimorph microactuator with very small lateral shift, Sensors and Actuators A: Physical 145, 371-379 (2008)] have been achieved with minimal lateral deflection. Additionally, angular displacements of over 30° have been obtained using electrothermal actuators [J. Sun, S. Guo, L. Wu, L. Liu, S. Choe, B. S. Sorg, and H. Xie, 3D in vivo optical coherence tomography based on a low-voltage, large-scan-range 2D MEMS mirror, Optics express 18, 12065-12075 (2010)].

Figure 13:
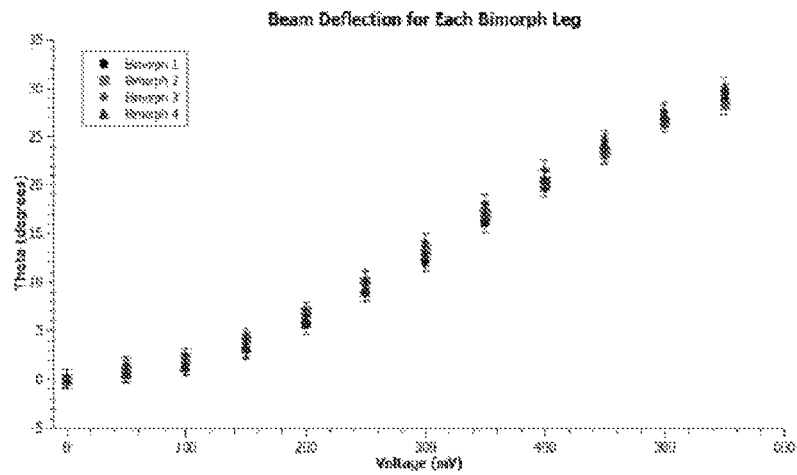
FIG. 13 is a graph showing beam deflection angle plotting over the bias voltage.

The optical deflection is shown in FIG. 13 for Mirror 1. Two opposite bimorph legs were held at a constant 500 mV which pulled the mirror to a baseline height lower than the maximum height. The out of plane projection of the bimorphs forces a rotation of the mirror structure. This rotation is annotated in FIGS. 9A-9B. An asymmetry in the mechanical forces on the mirror shifts the pivot point from center when actuated along one axis. The baseline height is decreased in order to reduce rotation of the mirror while actuating one leg independently from the other three and increase the angular range. A third leg was held at 0 V while the bias for the last leg was varied from 0 V to 550 mV (the variable deflection leg).

Figure 14:
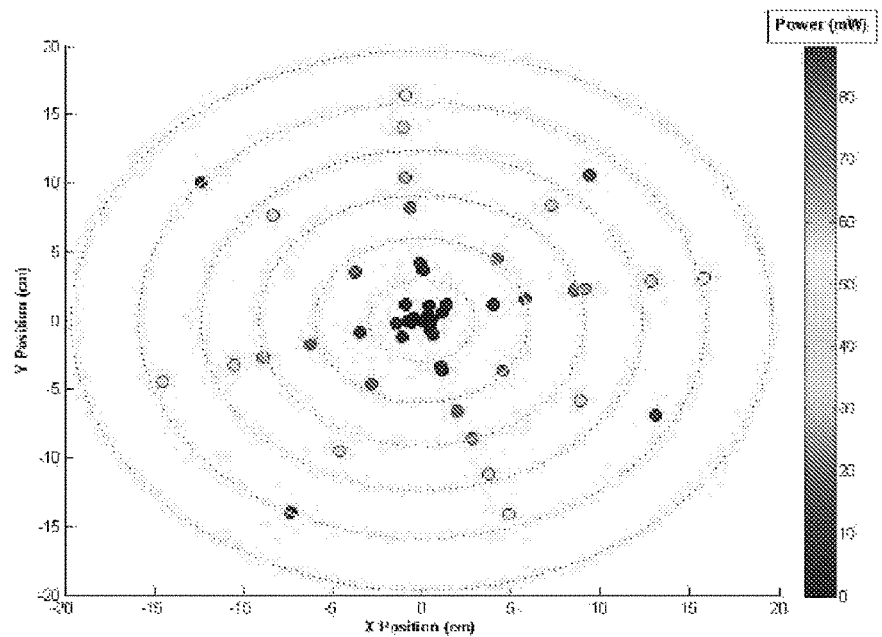
FIG. 14 is a graphical representation of the beam position on a viewing screen. Each dotted circle represents a 5° increment from the center. The color of each point corresponds to the power required to achieve that position.

The same angular range was demonstrated for each of the four bimorph legs when acting as the variable deflection leg. The optical deflection range is decreased to 26° if the baseline legs are at 0 V, such that the baseline height as the maximum height of the mirror. FIG. 14 illustrates the position of the shifted beam on a viewing screen above the micromirror. Each dotted circle on the graph represents 5° deflection from the center. The lines closer to the horizontal and vertical axis are the position as only one bimorph is actuated at a time up to approximately 500 mV. The off axis lines are position measurements when two of four bimorph legs are actuated simultaneously and held at roughly the same power. In both cases, the maximum deflection is between 24° and 26°. Thus, a non-zero constant power is required to establish the baseline height in order to achieve the 30° deflection and reduce rotation of the mirror as it is actuated. In accordance with some embodiments of the invention, larger micromirror deflection angles (e.g., 90 degrees or more, but only around one axis) can be achieved by configuring the system with only 2 support elements to manipulate the micromirror support platform.

Figure 15:
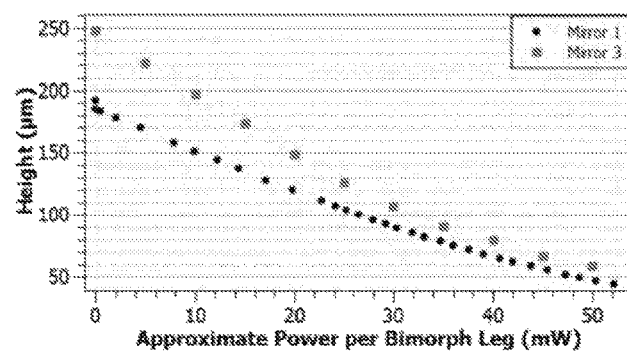
FIG. 15 is a graph showing the height of the center of the micromirror as all four bimorph legs are actuated simultaneously.

Actuation of all four bimorph legs results in a piston-mode vertical deflection. The total vertical deflection depends on the initial curvature of the bimorph legs which can be tuned with an initial rapid thermal annealing procedure. The displacement of two mirrors, one of which is Mirror 1 from the data in previous figures, is plotted in FIG. 15 against the power provided to all four legs independently. Consequently, the total power is four times larger than the value on the x-axis. As the mirror is pulled toward the substrate, heat from the bimorph legs flows to the mirror and the curvature is affected. However, the reduction in focal range is limited as the curvature reaches a limit around −0.53 mm$^{-1}$ (−0.95 mm focal length) regardless of initial curvature. The degradation of focal range due to actuating all four bimorph legs is a worst case scenario for the mirror as the total heat provided by tilting the mirror cannot exceed the heat provided during vertical actuation unless intentionally heating the central mirror.

A tip-tilt-piston micromirror with wide varifocal range according to embodiments of the invention has been constructed and tested. The focal length is tunable from −0.95 mm (−0.70 mm when bimorph legs are not actuated) to +17.5 mm with <18 mW of electrical power. The mirror can be deflected ±30° symmetrically along two axes. The maximum range requires the mirror to first be pulled toward the substrate by two of the four bimorph legs. Without the baseline offset from the actuation of two bimorph legs, the optical deflection is between 24° and 26°. Vertical displacement can exceed 150 μm, however, this sets a limit on the minimum focal length to −0.95 mm. The integration of a large range varifocal membrane and steering actuators has tremendous implications in both optical systems in research and innovative lighting products. The design simplifies what would typically be a system of multiple optical components into a single device, therefore reducing both cost and complexity.

Example 3

Figures 16A, 16B:
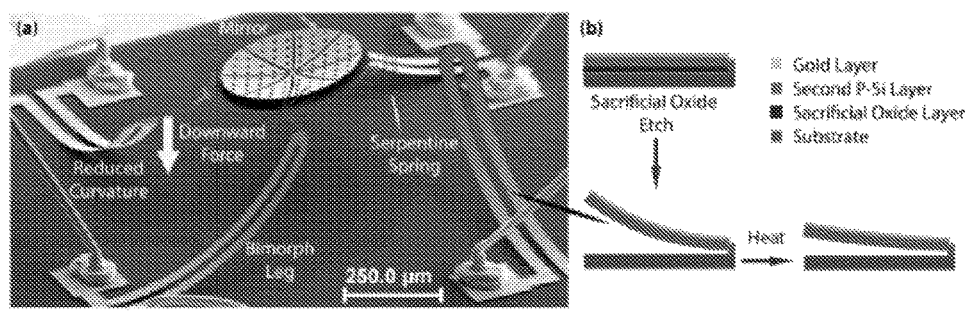
FIG. 16A is a SEM image of micromirror device in accordance with some embodiments of the invention.
FIG. 16B is an illustration of bimorph layers before and after oxide etch and reduced curvature due to heating.

The micromirror device shown in FIG. 16A is fabricated using a Multi-User MEMS Process (MUMPs) known as PolyMUMPs by MEMSCAP [18]. The fabrication includes three highly doped polysilicon layers, two sacrificial oxide layers, and a gold layer patterned using optical lithography. Residual compressive stresses in the polysilicon layer combined with residual tensile stresses in the gold layer due to the fabrication process provide a stress gradient along the boundary of the gold and polysilicon layers. Upon release, a bending strain due to the stress in the bimorph structures provides an initial curvature as shown in FIG. 16B. Bimorph actuators rely on a difference in coefficients of thermal expansion (CTE) of the two layers. The CTE of the gold layer is greater than that of the polysilicon resulting in a temperature dependent curvature [19], κ, given as:

$$\kappa \equiv \frac{1}{r} = \frac{1}{r_0} + \frac{6t(\alpha_{Au} - \alpha_{Si})\Delta T}{4t_{Au}^2 + 4t_{Si}^2 + 6t_{Au}t_{Si} + \left(\frac{E_{Au}t_{Au}^3}{E_{Si}t_{Si}}\right) + \left(\frac{E_{Si}t_{Si}^3}{E_{Au}t_{Au}}\right)} \quad (1)$$

where r is the temperature dependent radius of curvature, $r_0$ is the initial radius of curvature at room temperature, t is the sum of the individual layer thicknesses, $t_{Au}$ and $t_{Si}$, $\alpha_{Au}$ and $\alpha_{Si}$, are the temperature coefficients of expansion for each layer, $E_{Au}$ and $E_{Si}$ are the Young's Moduli of each layer, and ΔT is the temperature change.

Four bimorphs (e.g. support elements) can, for example, be positioned tangential to the mirror (or mirror platform) acting as the "legs" to raise and lower the mirror with respect to the substrate. Side-angle views of the bimorph legs are shown in FIG. 16B. The curvature, and therefore the tip height, of each bimorph leg can be finely tuned using Joule heating to deflect the mirror toward or away from the substrate as is illustrated in FIGS. 16A and 16B. To first order, the temperature change due to Joule heating in a resistor is linearly proportional to the electrical power, $\Delta T \propto I^2 \cdot R(T)$. Gold has a positive resistance temperature coefficient and as a result, when current biasing the system the power and temperature form a positive feedback loop prior to thermal equilibrium. When voltage biasing the bimorph, there is an initial power peak increasing the rate at which the thermal equilibrium is established. Voltage biasing avoids the runaway power increase possible when current biasing and is typically the drive method of choice for systems with positive thermal resistance coefficients [20]. However, as the resistance of the bimorph legs is typically the same order of magnitude of the resistance of the connected leads, a current bias provides better stability and control when a four point probe is unavailable. In accordance with some embodiments of the invention, the voltage can be pulse width modulated to precisely control the joule heating and precisely control the tip position of the bimorph support elements relative to the substrate.

Figures 17A, 17B:
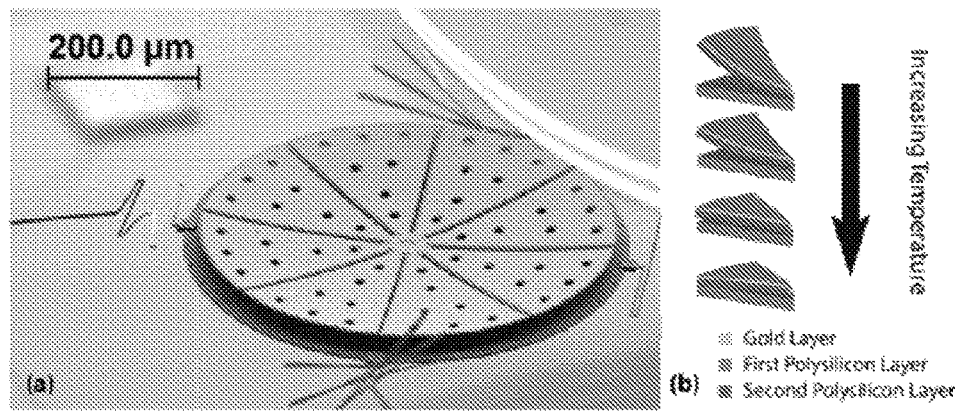
FIG. 17A is a SEM image of the mirror depicting the eight bimorph wedges.
FIG. 17B is an illustration of the wedge shape as Joule heating in the serpentine springs heats the platform and mirror.

Each of the four bimorph legs can be connected, at the tip, to a polysilicon serpentine spring, for example, having a 3.75 μm$^2$ cross sectional area, 160 μm arm length and being composed of 5 turns. These springs have a dual function: 1) they enable the bending, extension and twisting required to allow the mirror to be tilted to large angles and 2) as describe in detail below, the springs serve as local heaters for the central plate. While the serpentine springs are flexible enough to allow for large angles, frequency response measurements have shown a vertical (piston-mode) resonant frequency of ~700 Hz. As an order of magnitude approximation, the displacement of mirror under only gravitational forces can be approximated by $\delta \approx g/\omega_0^2 \approx 500$ nm, where g=10 m/s$^2$. This demonstrates that while the springs provide enough flexibility for angular deflection, the position of the mirror does not significantly deviate in response to low frequency noise. The springs can be connected to a circular polysilicon platform, 400 μm in diameter. Eight polysilicon and gold bimorph wedges extend from the center of the platform which functions as the thermal contact for the mirror wedges to transfer heat to each wedge causing the mirror wedges to change shape. The change in wedge shape is depicted in FIG. 17B from an unactuated state (top) to a heated state (bottom). By segmenting the mirror into eight individual wedges (although more less wedges can used), the bimorphs can deflect to a much greater degree than would be possible with a solid membrane. The long silicon springs thermally isolate the mirror from the bimorph legs.

Figure 18:
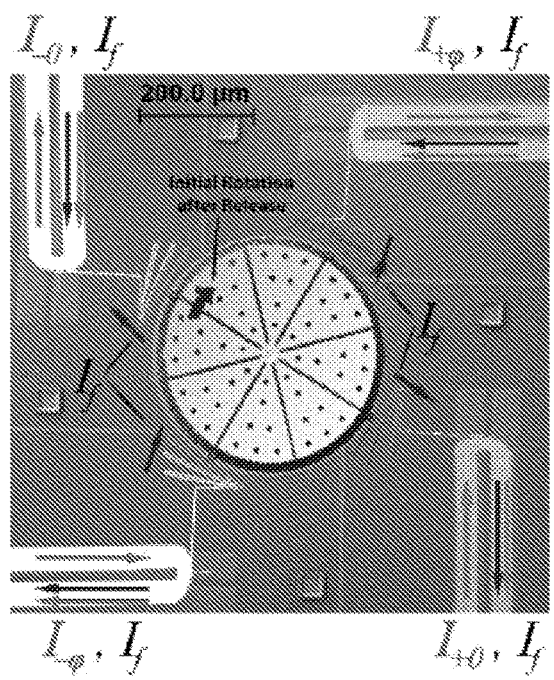
FIG. 18 is a SEM image with an actuation overlay. Eight electrical leads are used to control both deflection and variable focus. Leakage current through the springs due to $I_{\pm\theta/\varphi}$ results in negligible power consumption and is not shown here.

The device can have at least three electrothermal actuation modes which can be controlled independently. The scanning modes can be achieved by applying a current $I_{\pm\theta}$ and/or $I_{\pm\varphi}$, as shown in FIG. 18. Much of the resulting current is directed along the gold layer of the bimorph as a result of the metal having much greater electrical conductivity than polysilicon. The room temperature resistance of the serpentine springs is $R_{sp} \approx 10$ kΩ, 1500 times larger than the bimorph leg resistance, $R_b \approx 4.5$Ω. The impedance mismatch of the serpentine springs and bimorph legs allows for decoupling of the focal electrothermal actuation and deflection electrothermal actuation. Additionally, the 3.75 μm$^2$ cross sectional area and significant length of the springs creates a thermal barrier through which heat due to actuation of the bimorph legs is impeded. Although the power required to heat the serpentine springs is approximately the same as is required to heat the bimorphs, the current required to heat the serpentine springs is two orders of magnitude less than is required to heat the bimorphs. As a result, the power dissipated in the bimorph legs due to the current provided to heat the mirror is negligible compared to the power required to heat the legs. To determine the leakage power through the serpentine springs due to the actuation of a single bimorph, the leakage current through each of the four springs can be calculated using the potential at the tip of the actuated bimorph. In this case, the power ratio dissipated in the springs with respect to the bimorph scales as $9 R_b/64 R_{sp}$ for the nearest spring and $R_b/64 R_{sp}$ for the other three springs. The piston mode is available by actuating all four legs at the same power.

Heating the mirror wedges changes their curvature. This deflection dictates the dynamic focal length as the radius of curvature is twice the focal length, $f=r/2$. By introducing a current, $I_f$, between any of the two legs, as shown in FIG. 18, the serpentine springs can be heated. The highly doped silicon also has a positive resistance temperature coefficient resulting in an increase in resistance to from $R_{sp}(T_{room}) \approx 10$ k$\Omega$ to $R_{sp}(T_{hot}) \approx 14$ k$\Omega$. The thermal energy in the springs flows to the platform and the mirror bimorph wedges, flattening them from their initial curved position. The resistance of the bimorph legs increase from $R_b(T_{room}) \approx 4.5\Omega$ to $R_b(T_{hot}) \approx 6.0\Omega$ when heated. Thus, at any temperature, the power dissipated in the springs due to leakage current from the bimorphs is two orders of magnitude less than is required to flatten the mirror.

Figures 19A, 19B:
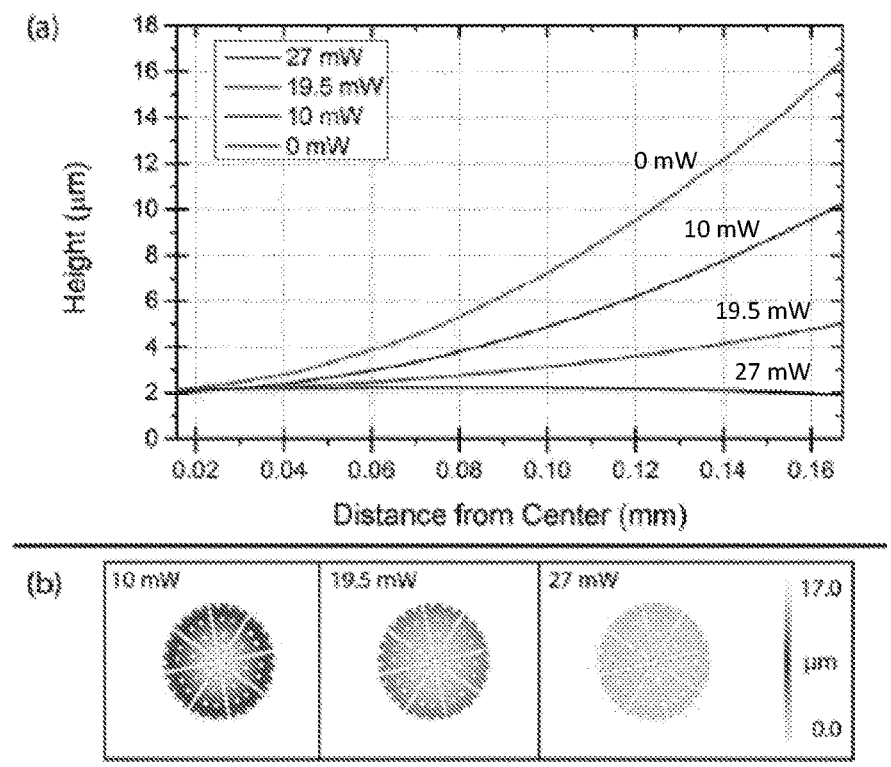
FIGS. 19A-19B shows optical profiler measurements of (FIG. 19A) the average radial profile from the center of the mirror, (FIG. 19B) a surface plot for three actuation powers.

The focal range can be characterized with an optical surface profiler. FIGS. 19A-19B depicts mirror curvature measurements as the mirror is actuated. FIG. 19A is a measurement of the average radial height of the mirror relative to the center. For no actuation, ($P_f=0$ mW) a focal length of −0.48 mm is measured. This can be tuned to 20.5 mm by providing 1.5 mA of current ($P_f=27$ mW) to the mirror such that each spring dissipates 6.75 mW.

Figure 20:
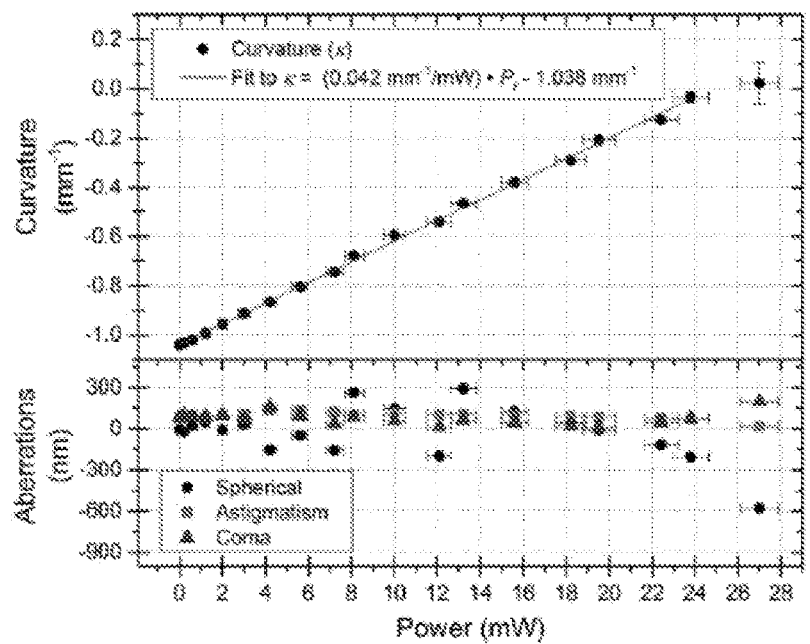
FIG. 20 shows curvature (top) and Zernike (bottom) versus power based on a spherical fit to the optical profile of the gold layer. The curvature is fit to $\kappa = (0.042 \text{ mm}^{-1}/\text{mW}) \cdot P_f$ mW−1.038 mm$^{-1}$ with the exception of the last point where the wedges come into contact with the platform.

The curvature, $\kappa=1/(2f)$, shown in FIG. 20 was measured by fitting a sphere to the gold layer profile. The central thermal contact provides a unique advantage as any temperature distribution originating from the springs is inconsequential to the thermal distribution on the wedges, as they are essentially heated from a point source at the center. As a result, any asymmetry in power dissipated between the springs does not degrade the optical properties of the mirror. The curvature when the mirror is unactuated is dependent on an initial thermal treatment and can be tuned to obtain the desired minimum focal length by altering annealing times and temperatures. The minimum focal length is also dependent on the initial maximum actuation power, $P_f$, which determines the level of self-annealing. All subsequent actuations are kept below the first maximum power to ensure reproducibility.

The upper limit on curvature is determined by the 2 μm proximity of circular platform beneath the wedges. The most significant aberrations, measured using Zernike polynomials, were spherical aberration, astigmatism and coma and are shown in FIG. 20. The spherical aberrations were consistently within ±300 nm, where the astigmatism and coma aberrations fall in the 0-200 nm range, until the last measurement where the curvature error was on the same order as the aberrations ($P_f>26$ mW) and the wedges were in contact with the platform. This effect can be eliminated by replacing the platform with a rim and radial attachments allowing the wedges to deflect beyond the rim.

The reflectivity of the mirror is largely governed by the surface area and scattering due to the release holes. The release holes reduce the surface area by approximately 5% and the surface area of the segment dividers reduces the effective mirror size by approximately 9%. In all, the reflectivity of the mirror is 14% less than a solid membrane before accounting for scattering and diffraction losses. The surface areal losses can be reduced by complete elimination of the release holes which would subsequently increase the etch time. This would also reduce scattering and diffraction losses. A more detailed study is required to understand fully the overall optical losses as they are largely dependent on the angle of incidence and the wavelength of the incident light [21].

Electrothermal actuation can be used to provide large angle mechanical deflections in the MEMS micromirror. Vertical (piston mode) displacements of over 600 μm [22] have been achieved with minimal lateral deflection. Additionally, optical beam deflections of over ±30° to ±40° can be obtained using electrothermal actuators [23].

Figures 21A, 21B, 21C:
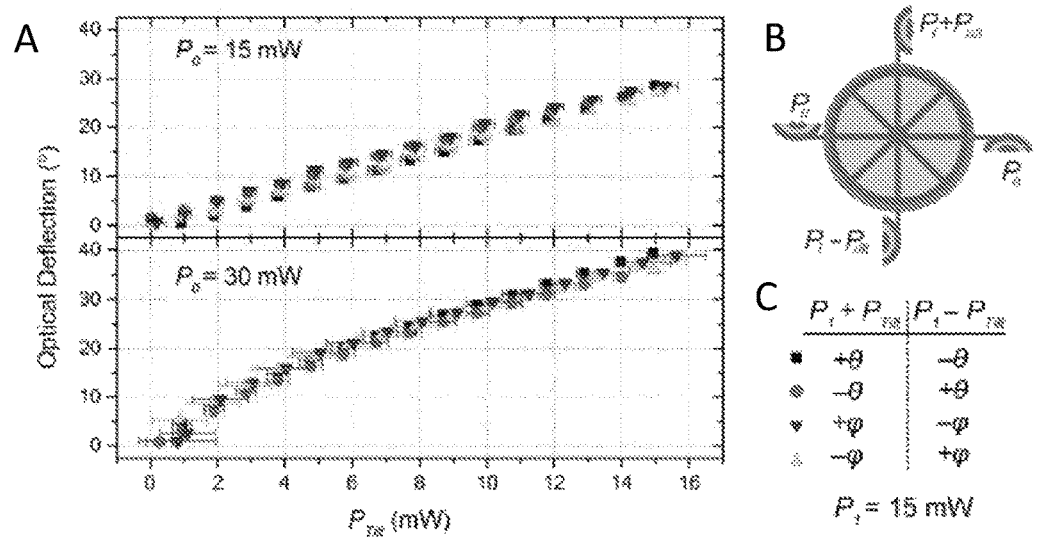
FIG. 21A shows beam deflection angle plotted against actuation power when $P_0=15$ mW and when $P_0=30$ mW.
FIG. 21B is a diagram illustrating the powers of the bimorph legs during actuation.
FIG. 21C is a table showing the labels for the power provided to each leg given as subscripts ±θ and ±φ as shown in FIG. 18.

The optical deflection range of the MEMS present here is shown in FIG. 21A. The out of plane projection of the bimorphs following the oxide etch forces a rotation of the mirror about the vertical axis, illustrated in FIG. 18. Thus, if a single bimorph is actuated the mirror pivots such that the axis of rotation is not constant and the symmetry of the four bimorphs is lost. To reduce rotation of the mirror and platform, the baseline mirror height is decreased by actuating two of the four bimorphs at an offset power, $P_0$. The other two bimorphs are actuated using a differential power based on the initial current-voltage measurements. The power is produced with a current bias such that $P_{\theta,\varphi}=P_1 \pm P_{Tilt}$, where $P_1=15$ mW is held constant at half the maximum power and $P_{Tilt}$ is varied between 0 mW and 15 mW. The error in $P_{Tilt}$ is dominated by the temperature dependence of the resistance and results in an asymmetric power differential between legs. Two scenarios are shown in FIG. 21A, the first with $P_0=15$ mW yielding a total constant power of 60 mW and the second with $P_0=30$ mW yielding a constant total power of 90 mW. When $P_0=15$ mW, the angular deflection is linearly proportional to the differential applied power, $P_{Tilt}$. Furthermore, the beam deflection along the θ and φ axes are kept independent of one other, providing a straightforward trigonometric relationship between the Cartesian coordinates of the reflected spot on a screen and power provided to the bimorph legs. Increasing the offset power to $P_0=30$ mW increases the maximum optical deflection. However, the angular deflection at low $P_{tilt}$ is no longer linearly proportional to $P_{Tilt}$ because the mirror pivot point is not held constant. The asymmetry causes the axis of rotation to shift for each actuation power such that the beam deflection does not follow a straight line, convoluting the relationship between deflection angle magnitude and beam direction.

Figure 22:
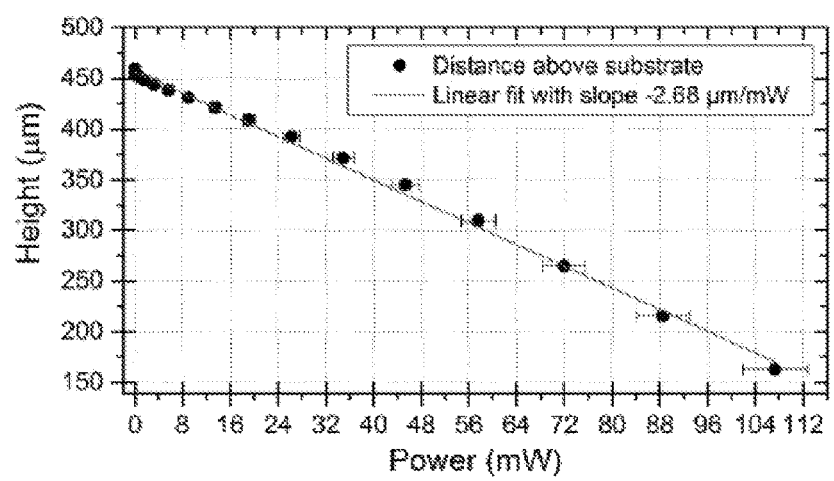
FIG. 22 is a plot showing the height above the substrate of the center of the micromirror as all four bimorph legs are actuated at the same power together. The red trace is a linear fit with a slope of −2.68 μm/mW.

Actuation of all four bimorph legs results in a piston mode vertical deflection. The vertical displacement is plotted in FIG. 22 versus the total power provided to the four bimorph legs. As the mirror is pulled toward the substrate, heat from the bimorph legs flows to the mirror and the minimum focal length is increased slightly to −0.87 mm. The reduction of focal range due to actuating all four bimorph legs is a worst case scenario for the mirror as the total heat needed for maximum tilt is lower than the heat applied for full vertical actuation. However, it must be noted that the piston and tip-tilt actuation modes are coupled. Actuating a mirror vertically reduces the tip/tilt range, as now $P_{\theta,\varphi}$, $P_0$ and $P_1$ are constrained.

Thermal cycling effects in the bimorphs limit curvature reproducibility and contribute to a deflection spread of approximately 3° during the first actuation. As previously mentioned, the first actuation of the mirror produces a nonlinear curvature vs. power relationship while the bimorphs self-anneal. A study on bimorph thermal cycling has been performed by Gall et al. [24]. The thermal cycling study, however, does not include temperature gradients due to electrothermal actuation. A more detailed study of the mirror cycling is required to ensure long term stability and deflection accuracy and is the focus of future work. The reproducibility of the system can be greatly improved upon by moving from the open-loop feedback control currently used to closed-loop feedback system [25] with either a power or a position sensitive PID loop.

Figures 23A, 23B:
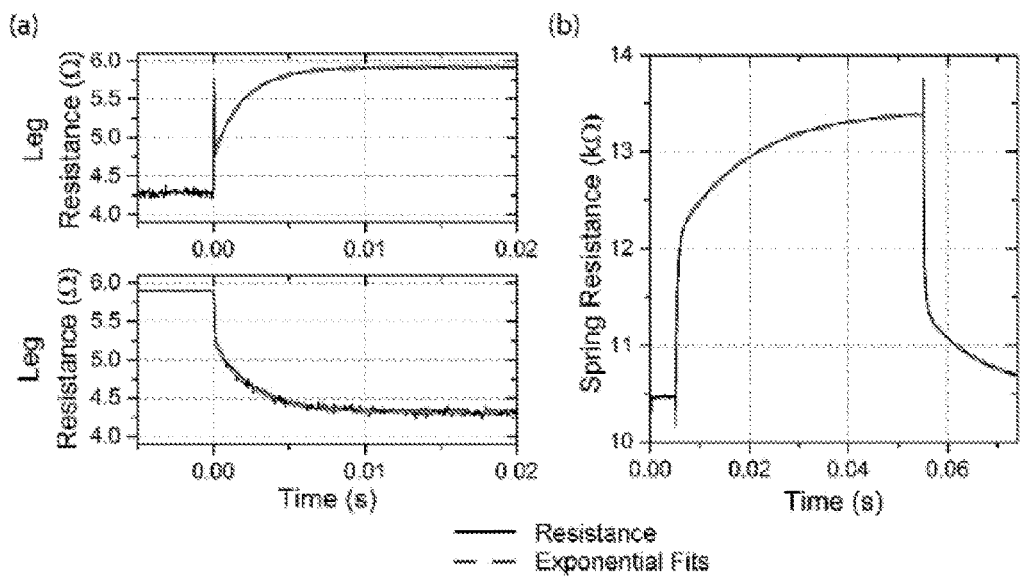
FIGS. 23A-23B are resistance measurements and exponential decay fits to $R(t)=R_0+R_f \cdot \exp(-(t-t_0)/\tau_{th})$ for a current pulse through (FIG. 23A) a bimorph leg and (FIG. 23B) the serpentine springs. The thermal time constants for the bimorph leg and mirror respectively were 2.0 ms and 14.9 ms for a step up in current and 2.5 ms and 11.7 ms for a step down in current.

The time dependent thermal response characterization of the system can be performed by applying a current or voltage pulse to the bimorph legs and the serpentine springs. For the legs, the power resulting from the current pulse corresponded to an optical deflection angle from approximately 10° to 28°. Likewise a current pulse resulting in a radius of curvature change from −1 mm$^{-1}$ to +0.05 mm$^{-1}$ was used to measure the thermal response time of the mirror. The thermal time constant, $\tau_{th}$, is determined by fitting the measured resistance to the exponential function, $R(t)=R_0+R_1\exp(-(t-t_0)/\tau_{th})$, where R(t) is the time dependent resistance, $R_0$ is the resistance at low power, $R_1$ is the change in resistance, t is the time and $t_0$ is the time when the step in current occurred. The bimorph leg time constants were measured to be 2.0 ms to heat the bimorph legs, while the cooling time constant was 2.5 ms (data shown in FIG. 23A). The serpentine springs and central plate/mirror have a thermal time constant of 14.9 ms while heating and 11.7 ms while cooling as determined from the data shown in FIG. 23B.

The difference in heating and cooling thermal time constants can be attributed to changing material properties with changing temperature [20]. Furthermore, when a current flows through the legs power is generated along the entire structure, rapidly heating the bimorph. When cooling all thermal power must flow to the base, resulting in a faster heating time constant than cooling time constant. This is the reverse for the mirror where heating is locally restricted to the serpentine springs. The thermal energy must then flow onto the mirror structure. The considerable surface area allows for thermal cooling directly to the surrounding air. Consequently, the mirror cools faster than it heats. A more detailed measurement of the thermal distribution is required to make assumptions regarding the temperature of the mirror wedges and springs. The slight reduction in curvature when actuating the legs indicates that the spring provides a considerable thermal barrier between the legs and the platform.

The mechanical response times of the mirror deflection were measured by detecting reflected light from the mirror with a position sensitive detector (PSD). All of the mechanical response measurements were driven with a voltage bias. The initial peak in power with a voltage bias due to the positive temperature coefficient of resistance results in shorter response times compared to a current biased drive. To improve the accuracy of the PSD measurements, the mirror was flattened to minimize the spot size of the reflected light by keeping $P_f$ at a constant 26 mW. FIGS. 24A-24D demonstrates the PSD measured response as a function of time when a voltage ramp is used to actuate a single leg. Three voltage drive schemes were implemented to reduce ringing and overshoot. The voltage steps all correspond to a power modulation of 0.02-27 mW (0-25° optical deflection), corresponding to an linear voltage ramp either increased from 10 mV to 400 mV or decreased from 400 mV to 10 mV over 5 ms, 1 ms or less than 100 μs (hereon referred to as a "step"). The mechanical rise time of the mirror, defined by the time required to deflect from 10% to 90% of the 25° deflection, is given in Table 2 for each drive scheme. Also included in Table 2 are the mechanical settling times defined as the time required for the system to equilibrate to within 1% of the final angle.

TABLE 2

Time Response of Micromirror Deflection

| Voltage Ramp Time | Rise Time | Rise Angle Over-shoot | Rise Settling Time | Fall Time | Fall Angle Over-shoot | Fall Settling Time |
|---|---|---|---|---|---|---|
| 5 ms | 5.2 ms | <1% | 12 ms | 4.1 ms | <1% | 7 ms |
| 1 ms | 4.4 ms | 1.7% | 18 ms | 3.1 ms | <1% | 10 ms |
| Step (<0.1 ms) | 4.8 ms | 3.0% | 21 ms | 2.2 ms | 1.9% | 14 ms |

Figures 24A, 24B, 24C, 24D:
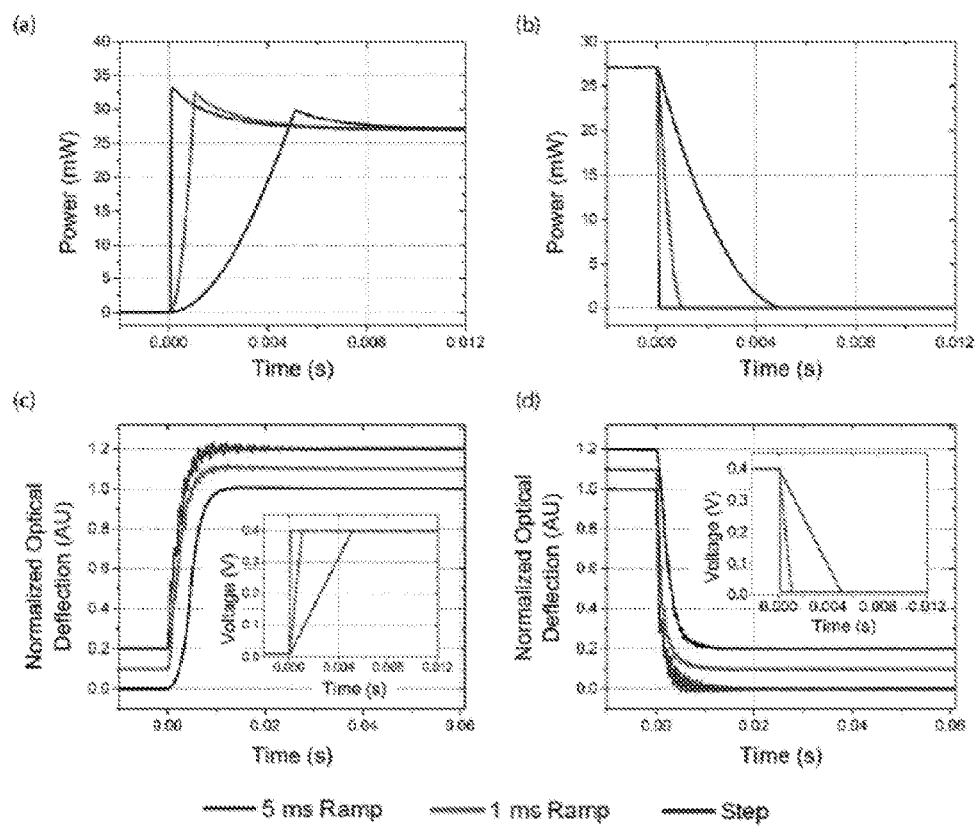
FIGS. 24A-24B are graphs showing the power dissipated in the bimorph leg based on the voltage ramp time.
FIGS. 24C-24D are the normalized deflection angles due to the voltage ramps measured using a PSD for each of the ramp times (inset graphs provide the actual voltage over time). The normalizations are each offset to reduce overlap.

A drastic reduction in ringing is clear for the responses of both rising and falling actuation voltages in FIGS. 24C-24D when the voltage is ramped over 5 ms compared to a step in bias. However, the rise times for the step voltage and 5 ms ramp differ by less than 0.5 ms indicating that the response time is limited by the thermal, not mechanical characteristics of the system. In addition, the overshoot in deflection angle is reduced to less than one percent during both rise and fall powers for the 5 ms ramp. Similarly, the settling time of the 5 ms ramp indicates very little ringing. The fall time increased by a factor of two between a 5 ms ramp and a step voltage. It is possible that this may be mitigated by using more sophisticated driving techniques to allow the slope of the voltage ramp to change over time so as to slow the temperature change at the start and increase the rate of change in voltage as the resistance plateaus.

Figure 25:
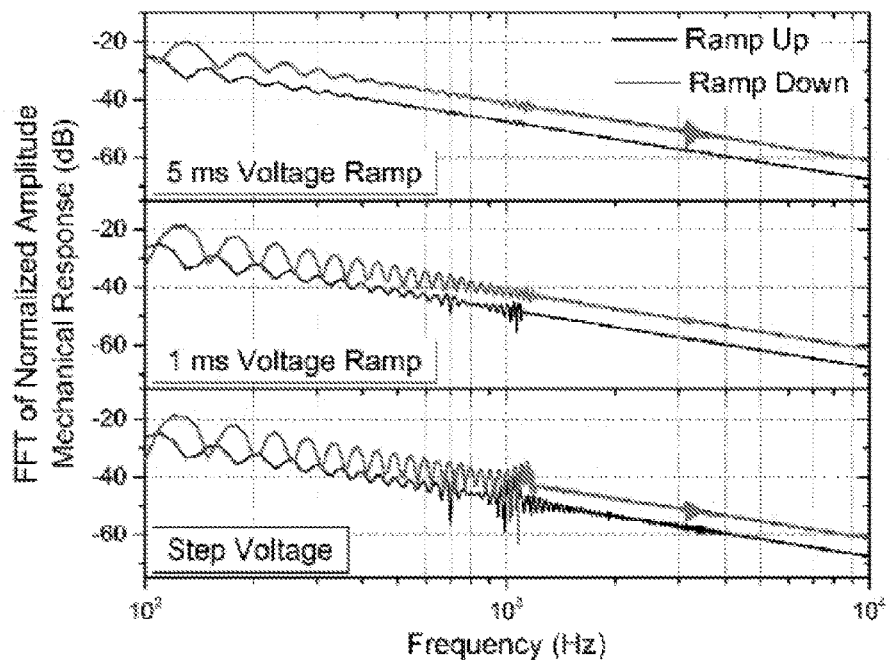
FIG. 25 shows fast Fourier transform (FFT) of the response when heating (up) and cooling (down) for varying voltage ramp times. The reduction in response of the first two resonant modes is clear when the voltage ramp is provided over 5 ms when compared to a step voltage.

The ringing for each drive scheme is most obvious when a Fourier transform (FFT) is performed on the mechanical response. FIG. 25 illustrates the frequency response of the mirror for each voltage ramp for both rise and fall of the system. The oscillation peaks can be mapped to their respective resonance frequencies from both measured data and simulated resonances. The first mode is a piston mode with a frequency of ~700 Hz and is only apparent during a voltage rise. The second resonance is a torsional mode at approximately 1 kHz. It is clear from the FFT that the torsional mode shifts in frequency between the rise and fall data. Finite element method (FEM) simulations show a frequency shift of approximately 100-200 Hz as the temperature is increased, but a more detailed study is required to fully understand the phenomenon. Similarly, the 3 kHz resonance seen in the FFT data has been observed during frequency sweeps with a lock-in amplifier and PSD system, but the mode shape is not clear at this point in time. FEM simulations show a higher order piston mode at ~2.5 kHz and a torsional mode at ~2.8 kHz. The mechanical response of the mirror wedges was not measured directly. However, it is assumed to be limited thermally as length of the wedges requires the mechanical resonance to be ~25 times greater than the bimorph legs, while the time to heat the springs is ~2-3 times longer. Thus, the thermal time constant governs the rate at which the focal length can be changed.

A tip-tilt-piston micromirror with wide varifocal range has been demonstrated. The focal length is tunable from −0.48 mm to +20.5 mm with 27 mW of electrical power. The mirror can be deflected ±40° or more along two axes with 90 mW of total electrical power. It should be noted that the deflection angle can be increased by using longer support elements having larger deflection ranges, potentially at the expense of response time and power consumption. Vertical displacement of up to 300 µm is possible, however this sets a limit on the minimum focal length of −0.87 mm and any vertical displacement puts a much more stringent limit on the possible deflection angle. The system in accordance with some embodiments of the invention also shows a response time of approximately 5 ms for large angles and can be driven such that any ringing is almost completely removed. The integration of a large range varifocal mirror with steering actuators has implications for both optical systems in research as well as innovative dynamic lighting products. The design described herein simplifies what would typically be a system of multiple optical components into a single device, therefore reducing both cost and complexity and significantly opening up the possible application space for such mirrors.

References For Example 3

1. D. L. Dickensheets, "Requirements of MEMS membrane mirrors for focus adjustment and aberration correction in endoscopic confocal and optical coherence tomography imaging instruments," J. Micro/Nanolithography. MEMS. MOEMS 7(2), 021008 (2008).
2. W. Noell, P. A. Clerc, L. Dellmann, B. Guldimann, H. P. Herzig, O. Manzardo, C. R. Marxer, K. J. Weible, R. Dändliker, and N. De Rooij, "Applications of SOI-based optical MEMS," IEEE J. Sel. Top. Quantum Electron. 8(1), 148-154 (2002).
3. V. A. Aksyuk, F. Pardo, D. Carr, D. Greywall, H. B. Chan, M. E. Simon, A. Gasparyan, H. Shea, V. Lifton, C. Bolle, S. Arney, R. Frahm, M. Paczkowski, M. Haueis, R. Ryf, D. T. Neilson, S. Member, J. Kim, C. R. Giles, and D. Bishop, "Beam-Steering Micromirrors for Large Optical Cross-Connects," J. Lightwave Technol. 21(3), 634-642 (2003).
4. B. Qi, A. Phillip Himmer, L. Maggie Gordon, X. D. Victor Yang, L. David Dickensheets, and I. Alex Vitkin, "Dynamic focus control in high-speed optical coherence tomography based on a microelectromechanical mirror," Opt. Commun. 232(1-6), 123-128 (2004).
5. T. Sasaki and K. Hane, "Initial deflection of silicon-on-insulator thin membrane micro-minor and fabrication of varifocal mirror," Sens. Actuators A Phys. 172(2), 516-522 (2011).
6. R. Hokari and K. Hane, "Micro-mirror laser scanner combined with a varifocal minor," Microsyst. Technol. 18(4), 475-480 (2012).
7. M. J. Booth, "Adaptive optical microscopy: the ongoing quest for a perfect image," Light Sci. Appl. 3(4), e165 (2014).
8. M. Strathman, Y. Liu, X. Li, and L. Y. Lin, "Dynamic focus-tracking MEMS scanning micromirror with low actuation voltages for endoscopic imaging," Opt. Express 21(20), 23934-23941 (2013).
9. T. Sandner, "Translatory MEMS actuators for optical path length modulation in miniaturized Fourier-transform infrared spectrometers," J. Micro/Nanolithography. MEMS MOEMS 7(2), 021006 (2008).
10. S. Schweizer, S. Calmes, M. Laudon, and P. Renaud, "Thermally actuated optical microscanner with large angle and low consumption," Sens. Actuators A Phys. 76(1-3), 470-477 (1999).
11. J. Singh, C. C. Hoe, T. H. S. Jason, C. Nanguang, C. S. Premachandran, C. J. R. Sheppard, and M. Olivo, "Optical coherent tomography (OCT) bio-imaging using 3D scanning micromirror," Proc. SPIE 6432, C4320 (2007).
12. A. Jain, H. Qu, S. Todd, and H. Xie, "A thermal bimorph micromirror with large bi-directional and vertical actuation," Sens. Actuators A Phys. 122(1), 9-15 (2005).
13. K. Jia, S. Pal, and H. Xie, "An electrothermal tip-tilt-piston micromirror based on folded dual s-shaped bimorphs," J. Microelectromech. Syst. 18(5), 1004-1015 (2009).
14. S. R. Davis, G. Farca, S. D. Rommel, A. W. Martin, and M. H. Anderson, "Analog, non-mechanical beam-steerer with 80 degree field of regard," Proc. SPIE 6971, 69710G (2008).
15. W. Liu and J. J. Talghader, "Current-controlled curvature of coated micromirrors," Opt. Lett. 28(11), 932-934 (2003).
16. J. Y. Tsao, M. H. Crawford, M. E. Coltrin, A. J. Fischer, D. D. Koleske, G. S. Subramania, G. T. Wang, J J. Wierer, and R. F. Karlicek, "Toward Smart and Ultra-efficient Solid-State Lighting," Adv. Opt. Mater. 2(9)809-836 (2014).
17. P. Brandl, S. Member, S. Schidl, A. Polzer, W. Gaberl, H. Zimmermann, and S. Member, "Focus and MEMS-Based Beam Steering," IEEE Photon. Technol. Lett. 25(15), 1428-1431 (2013).
18. D. Koester, A. Cowen, and R. Mahadevan, "Poly-MUMPs design handbook," http://www.memscap.com/products/mumps/polymumps/reference-material.
19. W. H. Chu, M. Mehregany, and R. L. Mullen, "Analysis of tip deflection and force of a bimetallic cantilever microactuator," J. Micromech. Microeng. 3(1), 4-7 (1993).
20. S. T. Todd, S. Member, H. Xie, and S. Member, "An Electrothermomechanical Lumped Element Model of an Electrothermal Bimorph Actuator," J. Microelectromech. Syst. 17(1), 213-225 (2008).
21. J. Zou, M. Balberg, C. Byrne, C. Liu, and D. J. Brady, "Optical properties of surface micromachined mirrors with etch holes," J. Microelectromech. Syst. 8(4), 506-513 (1999).
22. L. Wu and H. Xie, "A large vertical displacement electrothermal bimorph microactuator with very small lateral shift," Sens. Actuators A Phys. 145-146, 371-379 (2008).
23. J. Sun, S. Guo, L. Wu, L. Liu, S. W. Choe, B. S. Sorg, and H. Xie, "3D in vivo optical coherence tomography based on a low-voltage, large-scan-range 2D MEMS mirror," Opt. Express 18(12), 12065-12075 (2010).
24. K. Gall, M. L. Dunn, Y. Zhang, and B. Corff, "Thermal cycling response of layered gold/polysilicon MEMS structures," Mech. Mater. 36(1-2), 45-55 (2004).
25. E. Merced, S. Member, X. Tan, S. Member, N. Sepúlveda, and S. Member, "Closed-Loop Tracking of Large Displacements in Electro-Thermally Actuated VO2-Based MEMS," J. Microelectromech. Syst. 23, 1073-1083 (2014).

Example 4

FIGS. 26A-26D, 27-34 show a novel MEMS mirror which integrates variable focus and dynamic beam steering, eliminating the need for multiple microsystems. The mirror provides ±40° optical deflection and a variable focal length which can be tuned from −0.48 mm to +20.5 mm. The mirror also can be actuated in a piston mode over a 168 µm range. The dynamics of the mirror were studied and a methodology for tuning the resonant frequencies were explored. The large optical deflection and variable focus ranges provide unique advantages in Smart Lighting systems, where field of view and dynamic optics are growing in demand due to the high mobility of handheld receivers within the lighting field.

This example presents a dynamic study of the multi-degree of freedom micromirror of the invention with large deflections and variable focus. The rotational symmetry and identical spring systems provide simple mapping from actuation power to angular deflection. However, these two properties induce degenerate resonance modes for tip and tilt scanning. Much has been done to mode-match vibratory MEMS such as gyroscopes [S. Sung, W. T. Sung, C. Kim, S. Yun, and Y. J. Lee, "On the mode-matched control of MEMS vibratory gyroscope via phase-domain analysis and design," *IEEE/ASME Trans. Mechatronics*, vol. 14, No. 4, pp. 446-455, 2009]. In contrast, a system where degeneracies are suppressed is desirable in many applications such as in large deflection systems. For instance, the use of a scanning mode for color control in standard illumination and projection systems is a use case scenario where decoupled resonance modes are desired. Utilizing induced mechanical stresses in a serpentine spring and bimorph system to decouple degenerate resonant modes to increase the range of one mode and decrease the energy lost to the degenerate mode is discussed.

The micromirror can be fabricated by MEMSCAP using the PolyMUMPS process [D. Koester, A. Cowen, and R. Mahadevan, "PolyMUMPs design handbook," MEMSCAP Inc, 2003]. In this process, there is one immobile polysilicon layer, two layers of polysilicon which can be used as active mechanical layers and a gold layer atop the uppermost polysilicon layer. The design presented in this paper uses the residual stresses in the gold and top-most polysilicon layer as a thermomechanical bimorph actuator in both the beam steering and dynamic focus degrees of freedom. In both cases, a combination of Joule heating and the difference in coefficients of thermal expansion allow for large deflections of the steering "legs" and the variable focus "wedges".

A voltage bias across the bimorph legs results in power dissipation throughout the actuated leg. The thermal stresses induce a bending moment along the bimorph leg resulting in a large vertical tip displacement. The four serpentine springs extending out from the mirror are vital to both the mechanical and the thermal properties of the mirror. While the springs allow for an initial projection of the mirror out of the plane upon release and provide the flexure needed for large deflections of the mirror, they also act as heat sources for the minor bimorph wedges. A large impedance mismatch between the bimorph legs and the polysilicon serpentine springs allows for full and independent control of angular deflection, piston mode and tunable focus.

Figure 26A:
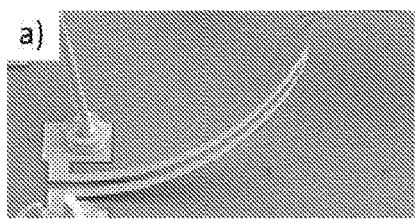
FIGS. 26A-26B is a set of SEM images showing deflection along one axis (tip or tilt) by a single support element.
Figure 26B:
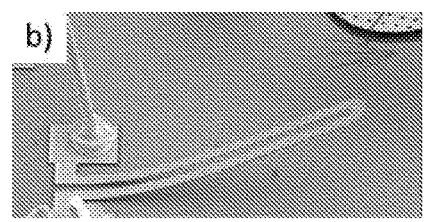
Figure 26C:
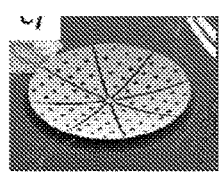
FIGS. 26C-26D is a set of SEM images showing the varifocal mode of the micromirror.
Figure 26D:
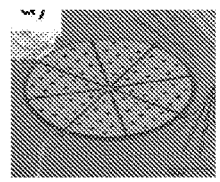
Figure 27:
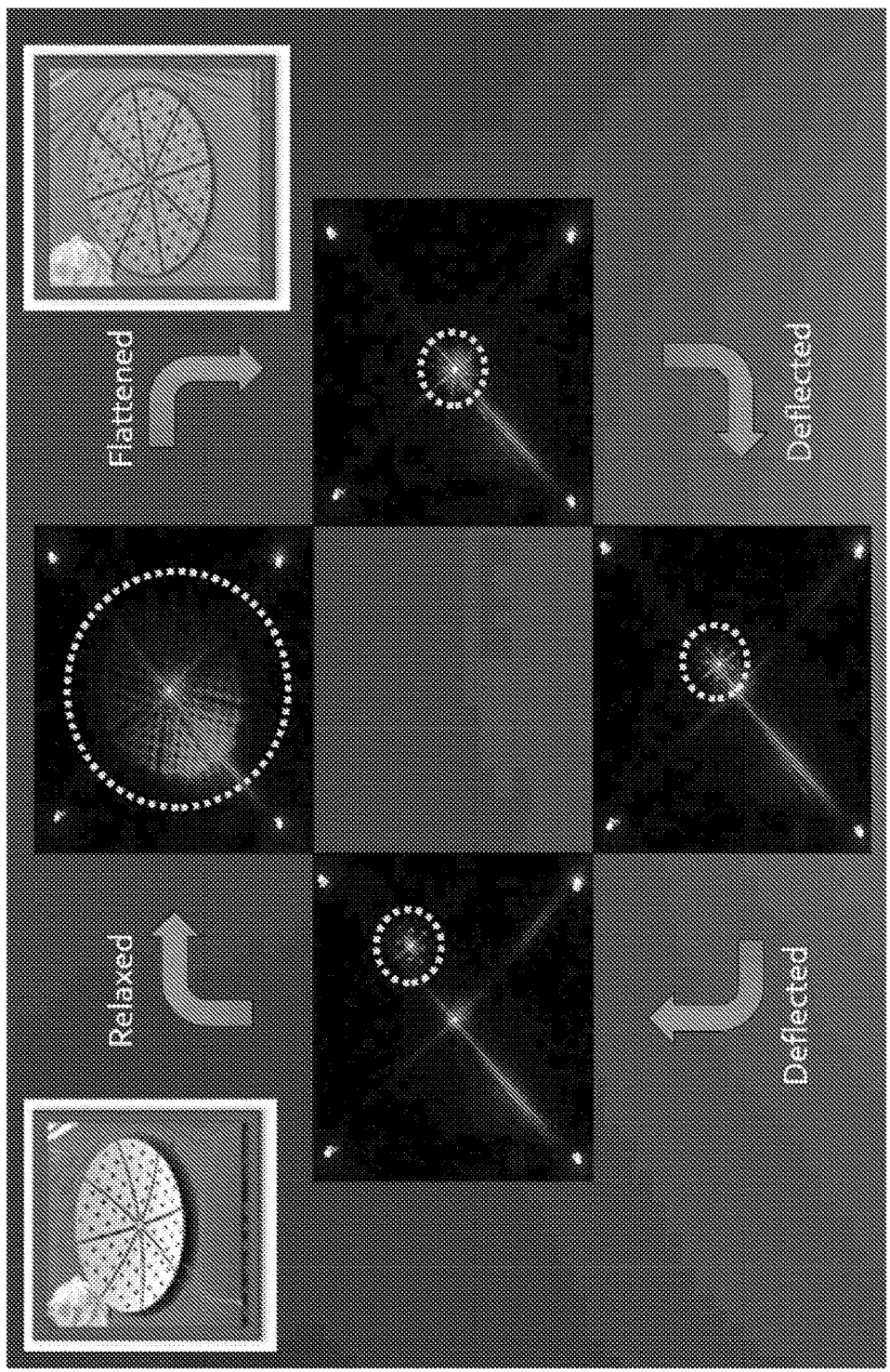
FIG. 27 is a set of optical images showing deflection of a light beam by the micromirror.

Previous designs incorporated 1000 μm long (and longer) bimorph legs in an effort to improve angular deflection. The length of the bimorph legs largely governs the amount of lateral motion of the tip of the bimorph demonstrated in FIGS. 26A and 26B. While providing the required height, the added length decreases efficiency as the first few milliwatts of power contribute mostly to lateral motion. Additionally, gold on polysilicon bimorphs become unstable as a threshold temperature is reached [K. Gall, M. L. Dunn, Y. Zhang, and B. a. Corff, "Thermal cycling response of layered gold/polysilicon MEMS structures," *Mech. Mater.*, vol. 36, No. 1-2, pp. 45-55, January 2004], narrowing the window in which a vertical displacement can be obtained for long beams. By reducing the length of the bimorph legs from 1000 μm to 600 μm, the lateral displacement is greatly reduced and the angular displacement of the mirror was more easily obtained for this geometry (e.g., using 4 support elements). Short bimorphs also improve linearity in the tip/tilt angle versus dissipated electrical power in the bimorph legs. FIGS. 26C and 26D demonstrate the dynamic range of the focal length.

Prior to the angular measurements a current-voltage sweep was conducted. The power-voltage relationship was then used to form an open-loop driven system using a voltage look-up table. For each static angular measurement, the mirror was voltage biased and the current and voltage were recorded using a four-point probe.

Figure 28:
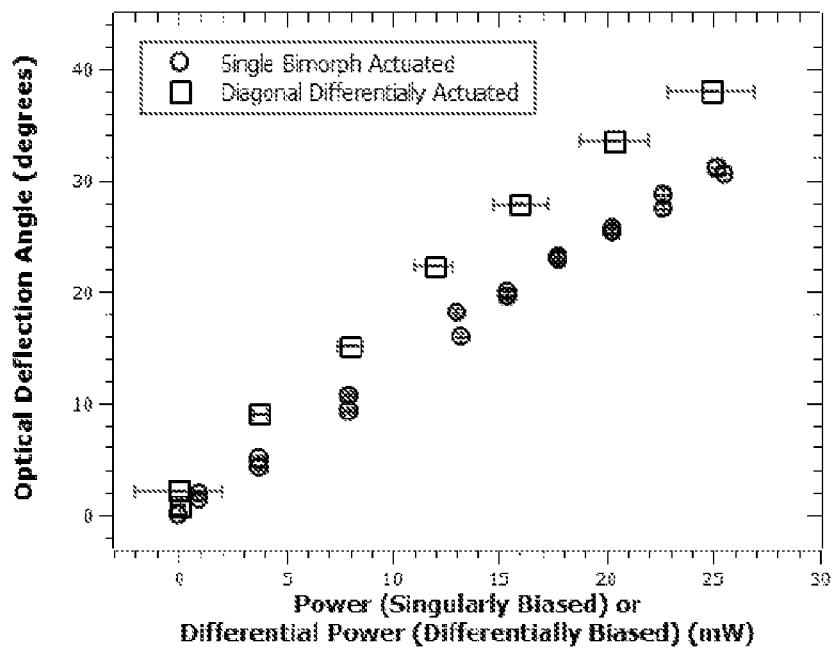
FIG. 28 is a graph showing the optical deflection for diagonal differential actuation (square), singular actuation (circle). Some error bars are too small to be seen.

The angular deflections for varying drive techniques were tested for both devices and are shown in FIG. 28. The diagonal range is measured using a power differential actuation where the four bimorphs are actuated at 12 mW to begin. From point of symmetry (12 mW), two adjacent bimorphs are increased while the other two are decreased until the power is 24 mW (or 0 mW). A greater error in power is associated with the differential measurements because the deflection associated with a 4 mW power differential symmetric about 10 mW does not produce the same deflection for one symmetric about 12 mW.

Figure 29:
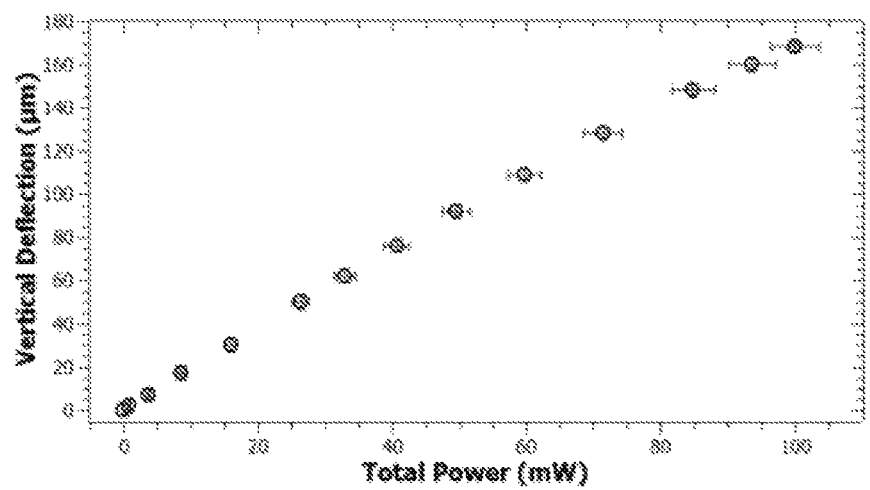
FIG. 29 is a graph showing the vertical deflection of the micromirror as a function of total power dissipated.

The vertical range of the mirror was measured using a Zygo optical interferometer. The bimorph legs were attached in series and current biased to ensure the same power dissipation in all four bimorph legs. FIG. 29 shows the vertical deflection as a function of the total power dissipated.

Figure 30:
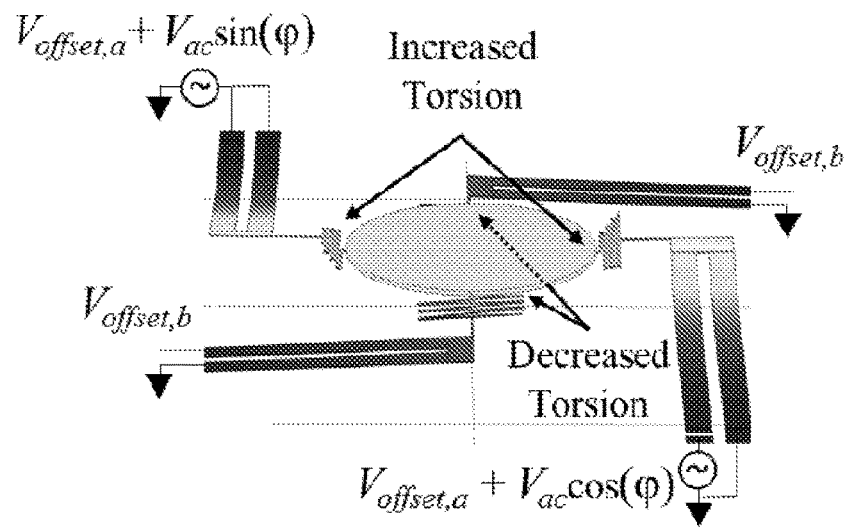
FIG. 30 is an image of FEM simulations of the mirror showing the difference in mechanical strain in the serpentine springs connected to bimorph legs with a nonzero offset power $V_{offset,b}$ with an overlay of the differential driving circuit.

Frequency scans were obtained when applying a differential AC voltage bias shown in FIG. 30 on two legs, while the other two legs were biased with $V_{offset,a(b)}$. The deflections were measured using a 2D position sensitive detector (PSD). The output of the PSD was coupled to a lock-in amplifier and recorded during each frequency sweep. Using the output from the PSD and the measured position of the PSD relative to the mirror, the magnitude of the angle was extrapolated and recorded during frequency sweep.

Figure 31:
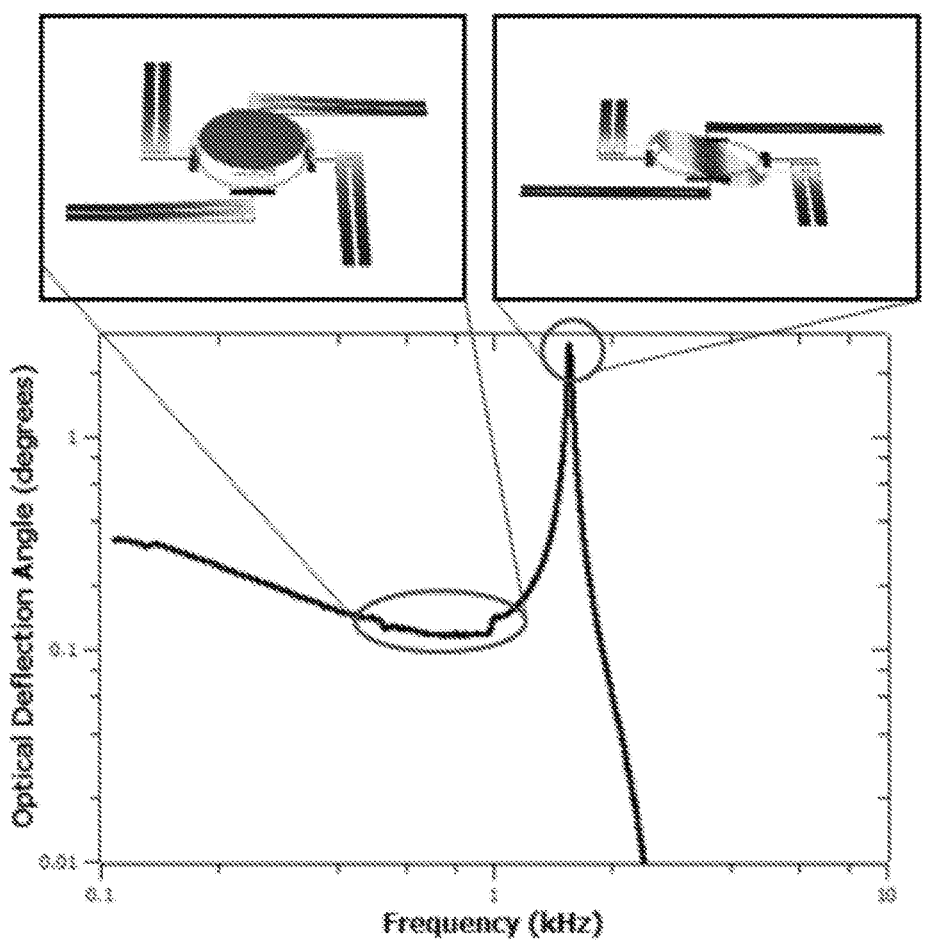
FIG. 31 shows the measured frequency response data with zero offset voltages is provided showing the corresponding mode shapes as simulated in COMSOL.

Finite element method (FEM) simulations of the device were conducted using COMSOL Multiphysics. The simulation eigenfrequencies of the mirror system were 1065 Hz for the piston mode and 1762 Hz for the degenerate tip and tilt modes. The measured resonances with zero offset and a $V_{ac}$ peak-to-peak value of 3 mV are 1552 Hz for both tip and tilt modes depicted in FIG. 31. The offset voltage for the frequency response shown in FIG. 31 is $V_{offset,(a,b)}=0$ mV. The piston mode resonance position is located at 500 Hz with a higher order piston mode located at 1 kHz. The simulations did not include the release holes and slight variations in the gold/polysilicon ratio due to design rules for PolyMUMPS.

Figures 32A, 32B:
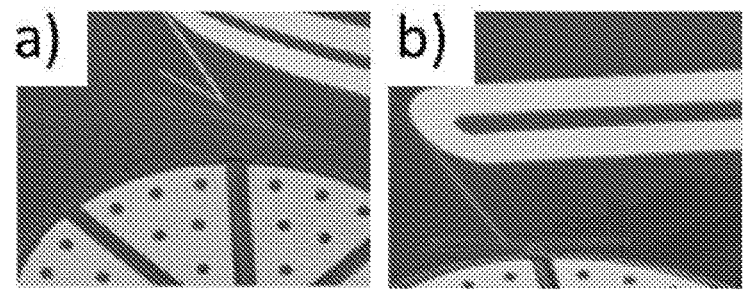
FIGS. 32A-32B are SEM images showing the spring deformation (FIG. 32A) prior to actuation and (FIG. 32B) during actuation of the bimorph.

Perfectly matched modes are useful for circular scanning but need to be suppressed for raster scanning. In the context of illumination and directional lighting, the most useful scenario is a large angle raster scan. To provide this capability, a method was constructed to either suppress the unwanted mode or to separate the modes while maintaining large amplitudes. The principle behind the decoupling is dynamically changing the strain in the serpentine springs and bimorph legs. As shown in FIGS. 32A-32B, actuation of a bimorph leg drastically alters the torsional and bending strain in the corresponding serpentine spring. Simultaneous actuation of opposite bimorph legs reduces the effective spring constant of the mode associated with rotation of the affected springs. In addition, the effective spring constant of the mode associated with rotation about the unactuated serpentine springs is increased slightly. FIG. 30 shows the simulated deformation of the serpentine springs upon applying a nonzero $V_{offset,b}$ while holding $V_{offset,\ a}=0$ mV.

Similar methodologies have been proven effective in scanning micromirrors for shifting a single mode by using a separate actuator [R. Bauer, G. Brown, L. Li, and D. Uttamchandani, "A novel continuously variable angular vertical comb-drive with application in scanning micromirror," *Proc. IEEE Int. Conf. Micro Electro Mech. Syst.*, pp. 528-531, 2013], [J. I. Lee, P. Sunwoo, E. Youngkee, J. Bongwon, and J. Kim, "Resonant frequency tuning of torsional microscanner by mechanical restriction using MEMS actuator," *Proc. IEEE Int. Conf. Micro Electro Mech. Syst.*, pp. 164-167, 2009].

Figure 33:
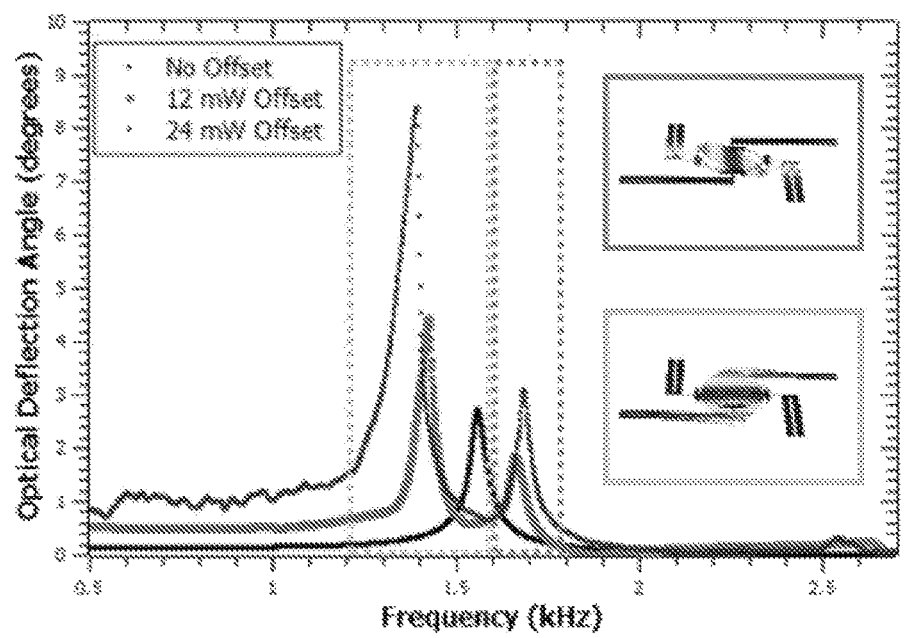
FIG. 33 is a graph showing measured frequency response data for varying $V_{offset,a}$ for a power of 0 mW, 12 mW and 24 mW in each of the offset bimorphs. Insets are mode shapes simulated in COMSOL.
Figure 34:
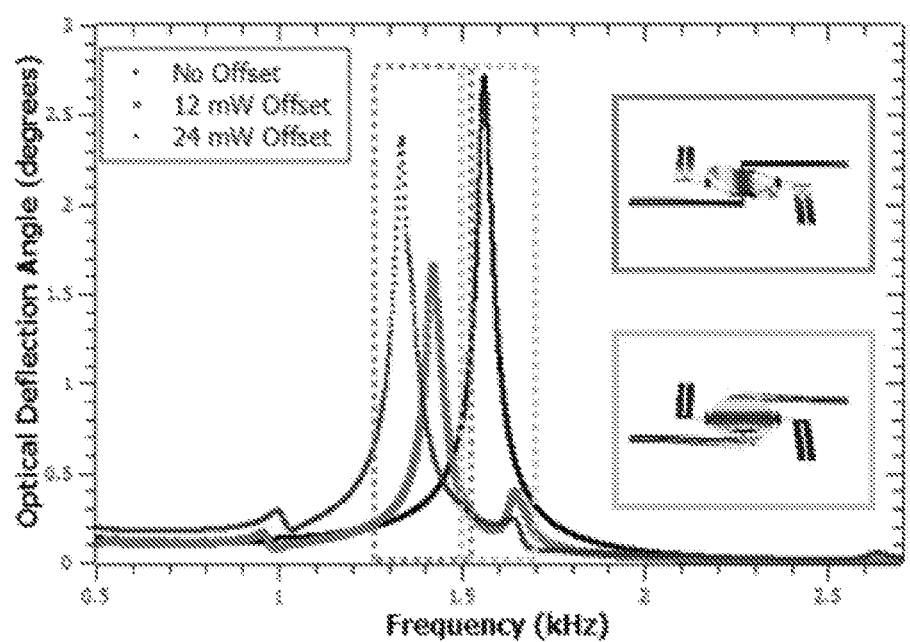
FIG. 34 is a graph showing measured frequency response data for varying $V_{offset,b}$ for a power of 0 mW, 12 mW and 24 mW in each of the offset bimorphs. Insets are simulated mode shapes.

The frequency response for variations in $V_{offset,a}$ and $V_{offset,b}$, corresponding to dissipated power in each of the offset bimorphs are shown in FIGS. 33-34. The determination of each mode was performed by capturing deflections of incident light from the mirror. The maximum response for the tilt mode (yellow) is shifted to a smaller frequency as $V_{offset,a}$ increases. In contrast, the tip mode (blue) increases. The increase in amplitude as the offset voltage is increased is an artifact of the constant voltage bias. A 3 mV peak-to-peak excitation corresponds to a greater power dissipation amplitude for a greater offset voltage and, consequently, a larger total energy in the system.

In contrast, if $V_{offset,b}$ is increased from 0 mV the tilt mode (yellow) is shifted to higher frequencies while the tip mode (blue) is shifted to lower frequencies. It is important to note the change in piston mode response and higher order tip/tilt modes (~2.6 kHz) in response to the offset variation. For both offset variations, the overall mode separations are similar and are summarized in Table 3.

TABLE 3

Summary mode separation due to mechanically straining specific sets of serpentine springs

| $V_{offset,a}$ Or $V_{offset,b}$ | Offset Power (mW) | Tip Mode (kHz) | Tilt Mode (kHz) | Mode Separation (Hz) |
|---|---|---|---|---|
| a | 24 | 1.68 | 1.39 | 290 |
| a | 12 | 1.66 | 1.43 | 230 |
| a, b | 0 | 1.55 | 1.55 | 0 |
| b | 12 | 1.64 | 1.42 | 220 |
| b | 24 | 1.65 | 1.33 | 320 |

An improvement of the static angular range compared to previous results was obtained by shortening the bimorph legs. While the total range remained consistent with previous results, the full range can be achieved without the use of differential power bias with an offset, thus reducing the required power to 25 mW. However, this produces a decrease in the vertical range to 168 µm compared to the previous 300 µm vertical range.

The functionality of the serpentine springs can be expanded beyond the mechanism for large deflections and used as a mechanical tool to alter the response frequency of the resonant modes. By adding strain to specified spring pairs, the degeneracies in the system can be lifted. Additionally, the strain can be tuned to increase the response for one of the degenerate modes while dampening the other as demonstrated in FIG. 34.

Example 5

The micromirror systems shown and described herein can be used in any device that incorporates a conventional MEMS mirror to provided improved functionality and enhanced performance. For example, an array of MEMS micromirror devices as described herein can be used to construct an optical network switch, such as an Exa-scale or Zetta-scale optical switch.

Figure 37:
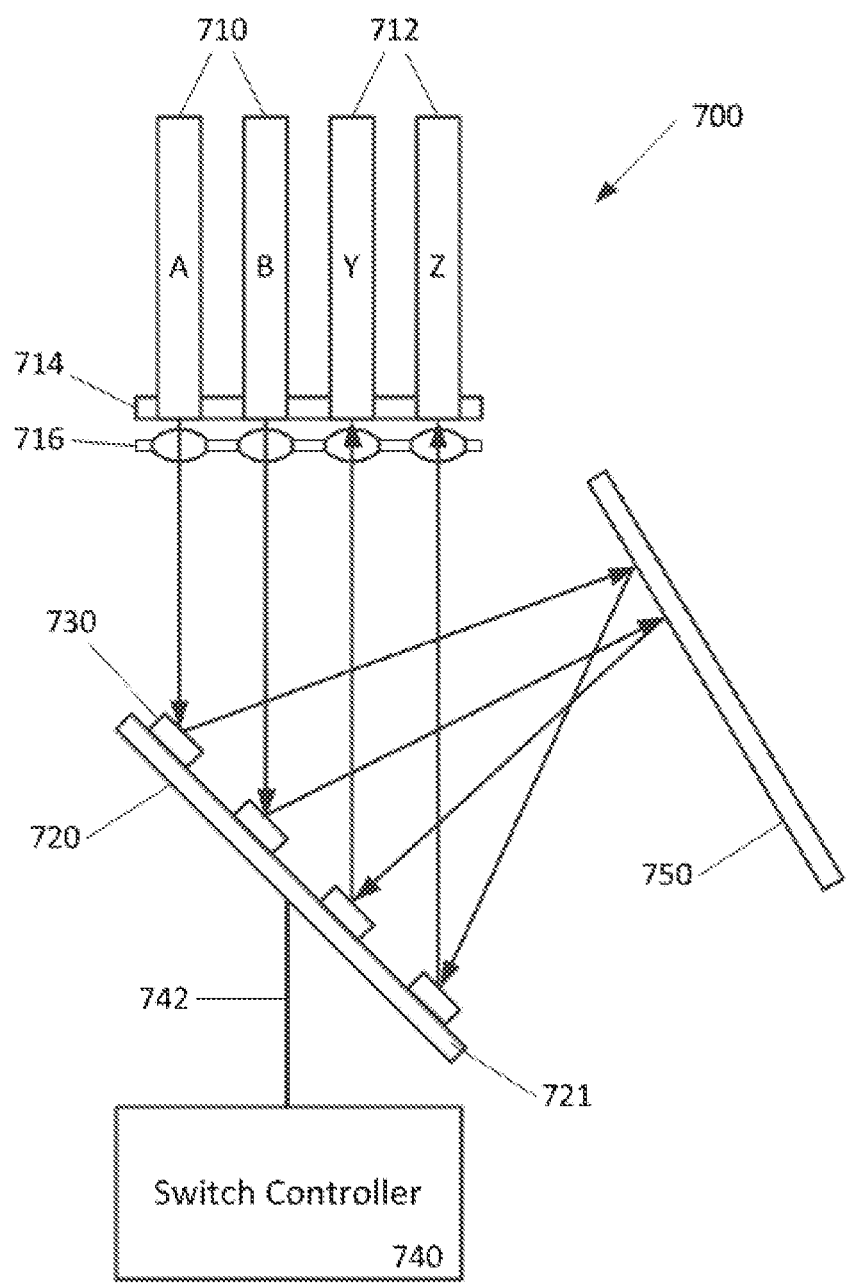
FIG. 37 shows a diagrammatic view of an optical network switch according to some embodiments of the invention.
Figure 38:
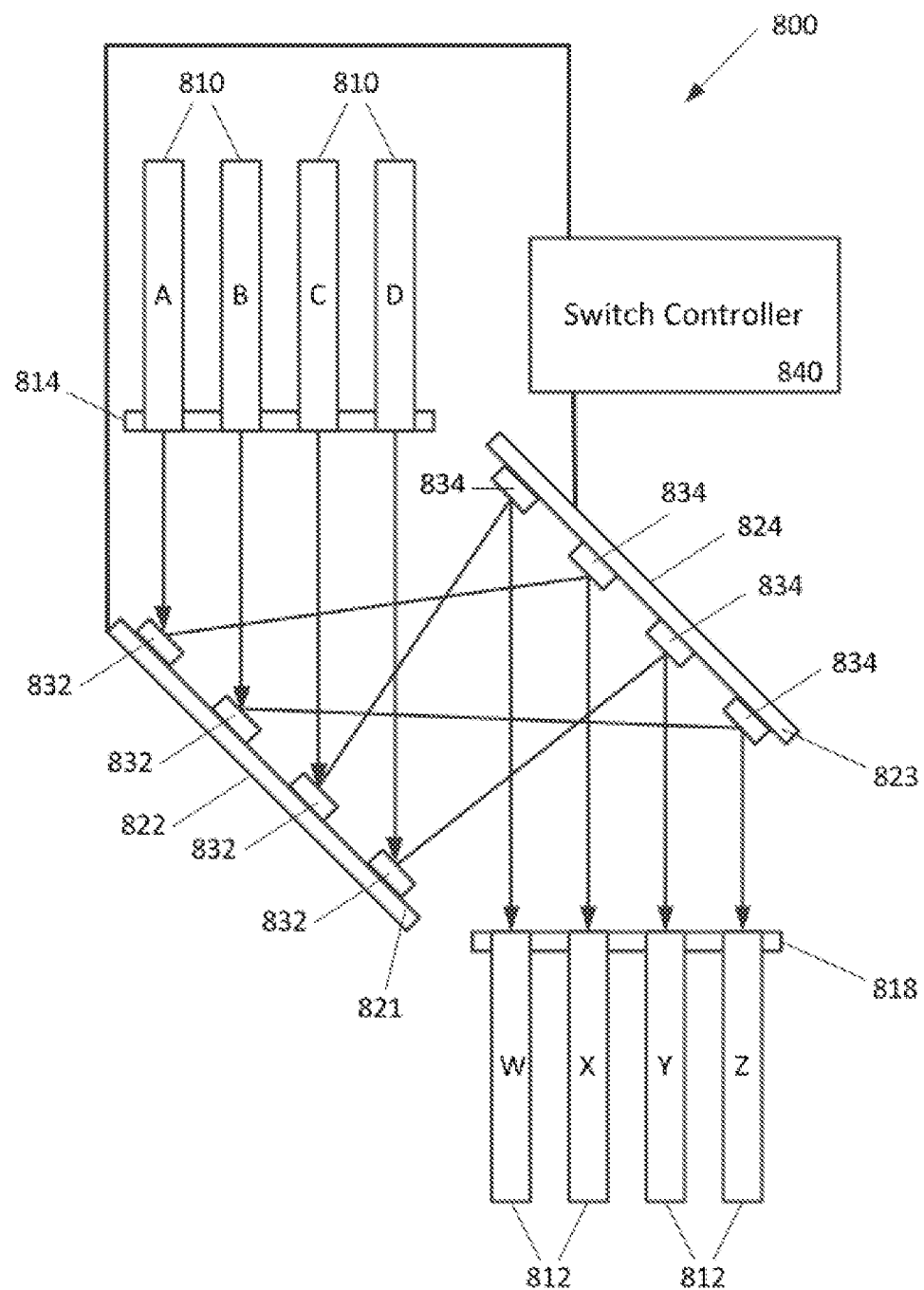
FIG. 38 shows a diagrammatic view of an optical network switch according to some embodiments of the invention.
Figure 39:
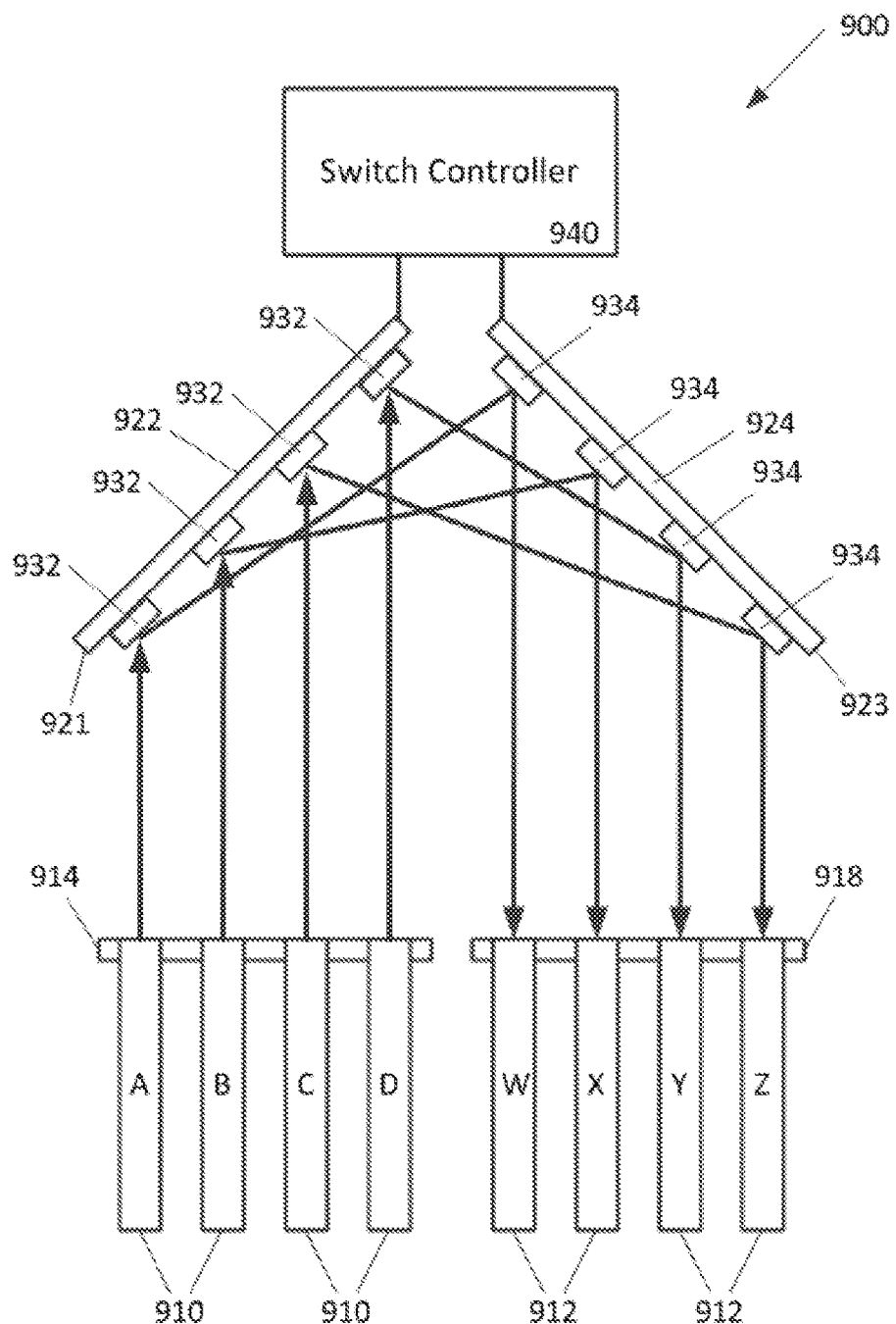
FIG. 39 shows a diagrammatic view of an optical network switch according to some embodiments of the invention.

Examples of the basic construction of such a switch are shown in FIGS. 37-39. Generally, the signal of an input optical fiber (carrying data) can be focused onto a MEMS micro-mirror and the angle of the micromirror can be controlled and changed to redirect to optical signal into any one of an array of output optical fibers. A controller can be used to control and change the angle of the micromirror to change the path of the optical signal. The controller can be used to provide either circuit switching or packet switching. Circuit switching can be more easily configured as the circuit (e.g., micromirror angles) can be defined and constructed in advance of the optical signal transmission. Packet switch can be provided with additional hardware that identifies destination address or labels and dynamically configures the micromirrors in real time to direct optical packets through the switch. In accordance with some embodiments of the invention, the switch can be configured to provide space division switching, wavelength division switching, time division switching and combination of space division switching, wavelength division switching, and time division switching by using the controller to control the angle of the micromirror to change the signal path of an optical signal.

As shown in FIGS. 1-3, 4A-4B and 35-36, a MEMS micro-mirror according to some embodiments of the invention can provide up to four degrees of freedom in a single device (e.g., varifocal, piston and tip/tilt). In static mode, the mirror can tip/tilt +/−40 degrees around two axes and access +/−55 degrees in a dynamic mode. The scaling rules for large optical switches show that the number of ports one can access are proportional to the square of the tilt angles. Accordingly, a mirror like that shown in figures can be used to build a system with (40/5.5)2×1296 or 68,500 ports. This mirror can be used to construct large (10 k by 10 k or 50 k by 50 k arrays) cross-connects that enables exa-scale and zetta-scale switch systems. In accordance with some embodiments of the invention, a typical optical switch can be constructed using MEMS micromirrors on a 1mm pitch. Using this scheme, a 10 k port device switch could be constructed using a mirror (and optical fiber) array that is 10 cm on a side or a 100 cm², forming softball sized switch fabric. Similarly, a zetta-scale switch could be approximately 23 cm on a side or 500 cm², forming soccer ball sized switch fabric.

The thermal bimorph actuators used to move the mirror each require, on average, 10 mW of power or roughly 50 mW per mirror. For an exascale switch this gives roughly 500 watts of power or ~5 W/cm2. Current microprocessors operate at roughly 150 W/cm2 and so we are well within current design norms. For a zetta-scale switch, the areal power density stays the same at ~5 W/cm2 and the total power increases to 2,500 Watts, well less than a current generation electrical switch. The MEMS micromirror can be power optimized. For example, the MEMS micromirror can be packaged in a vacuum, different metals for the bimorph structure can be used and the geometry of the bimorph can be further optimized to reduce the power needed to actuate it (e.g., by as much as a factor of ten). The bimorph requires a specified operating temperature and by reducing its width or cooling atmosphere, one can reduce the power needed to get to this temperature.

The MEMS micromirror devices are expected to cost about \$1/mm² in small quantities and \$0.10/mm² in volume. Fiber bundles and lens arrays tend to have costs that don't scale with area and the cost/port drops with increasing port size. The cost to build these very high capacity switches is expected to be in the $10-100/port range. Another cost consideration is drive electronics. The switch according to some embodiments of the invention can operate on power and can be driven using pulse width modulation techniques (PWM). The PWM drive circuit can use a fixed voltage and use the timing of fixed the voltage digital pulses to control the bimorphs (e.g., using one or more low cost FPGAs). It should be noted that the costs of building an electronic switch with this kind of capacity would be many orders of magnitude higher.

Currently networks are managed and groomed at the wavelength level, roughly 100-400 Gb/sec. Wavelength add/drop multiplexors are typically used for this task. As the overall scale of the data capacity of a network increases, so does the scale of the smallest tributaries that get actively managed. Typically one manages and grooms a network at a scale that is 1000 to 10,000 times smaller than the total aggregate capacity. If the granularity gets too large, the network is not optimized and money is wasted. If the granularity is too small, the cost overhead of dealing with the small tributaries overwhelms any possible cost benefits. These two limits set the natural scale for traffic grooming and management. The large switches described herein allow optimization at scales as small as 1/50 k of the total traffic, well within the kinds of needed management granularity for any modern network. In accordance with some embodiments of the invention, the switch can be a circuit switch. In accordance with some embodiments of the invention, the switch can be a packet switch. Today, most electronic switches are packet switches that route individual packets to their destinations. The energy costs of doing this today are nearly at the breaking point. Bandwidth growth over the next ten to twenty years will break this paradigm completely as aggregate capacities will grow by a factor of 20-50 per decade. The energy scaling considerations will, by necessity, likely drive a shift to high capacity, optical circuit switches as described herein for the highest levels of any network or data center.

Depending on the Q of the device, switching speeds for MEMS devices can be in the range of one to hundreds of milliseconds. In addition, engineered drive techniques can be used to improve these times by as much as a factor of a thousand. Accordingly, it is expected that a smaller switch configuration can use micromirror devices that operate on the order of 10 ms and that larger switch configurations can use micromirror devices that operate on the order of 1 ms or less.

FIG. 37 shows a diagrammatic view of a basic switch 700 according to some embodiments of the invention. The switch 700 can include one or more input optical fibers 710 and one or more output optical fibers 712 mounted to a fiber support guide 714 that aligns the fibers, for example, in an array such that the optical signals are aligned and directed at the individual micromirrors 730 of the switch backplane 720. The micromirrors 730 can be mounted to and arranged in an array (e.g., in a geometric, ordered, or random pattern) on the substrate 721 of the backplane 720 to align with optical fibers. The micromirrors can be electrically connected to the switch controller 740 which produces the electrical signals that are used to control the angular orientation of the micromirrors 730 to control the path of optical signal. As shown in FIG. 37, a first micromirror 730 can be used to direct the optical signal (from an input fiber 710) to reflect off stationary mirror 750 toward a second micromirror 730 which can be used to direct the optical signal to an output fiber 712. Optionally, a lens array 716 or other collimating components can be used to limit the dispersion of the optical signal received from the input optical fiber 710 and reduce optical losses. In accordance with some embodiments of the invention, the beam focusing capabilities (e.g., tuning the radius of curvature) of the micromirrors 730 eliminate the need for a collimating components.

The switch controller 740 can include a computer processor and associated memory (e.g., volatile and/or non-volatile memory) for storing and executing programs that control the operation and functionality of the switch.

FIG. 38 shows a diagrammatic view of a basic switch 800 according to some embodiments of the invention. The switch 800 can include one or more input optical fibers 810 mounted to a fiber support guide 814 that aligns the fibers, for example, arranged in an array (e.g., in a geometric, ordered, or random pattern), such that the input optical signals are aligned and directed at the individual micromirrors 832 of the input switch backplane 822 and one or more output optical fibers 812 mounted to a fiber support guide 818 that aligns the fibers, for example, arranged in an array (e.g., in a geometric, ordered, or random pattern), such that the output optical signals from the individual micromirrors 834 of the output switch backplane 824 are aligned and directed at the output optical fibers 812. The micromirrors 832 can be arranged in an array (e.g., in a geometric, ordered, or random pattern) on the switch backplane 822 and the micromirrors 834 can be arranged in an array (e.g., in a geometric, ordered, or random pattern) on the switch backplane 824. As shown in FIG. 38, a micromirror 832 on the input switch backplane 822 can be used to direct an optical signal from an aligned input optical fiber 810 toward any one of the micromirrors 834 on the output switch backplane 824 and the micromirror 834 can be used to direct the optical signal to any one of the output optical fibers 812. The micromirrors 832, 834 can be electrically connected to the switch controller 840 which produces the electrical signals that are used to control the angular orientation of the micromirrors 832, 834 to control the path of optical signals through the switch 800.

The switch controller 840 can include a computer processor and associated memory (e.g., volatile and/or non-volatile memory) for storing and executing programs that control the operation and functionality of the switch.

FIG. 39 shows a diagrammatic view of a basic switch 900, similar to switch 800, according to some embodiments of the invention. The switch 900 can include one or more input optical fibers 910 mounted to a fiber support guide 914 that aligns the fibers, for example, arranged in an array (e.g., in a geometric, ordered, or random pattern), such that the input optical signals are aligned and directed at the individual micromirrors 932 of the input switch backplane 922 and one or more output optical fibers 912 mounted to a fiber support guide 918 that aligns the fibers, for example, arranged in an array (e.g., in a geometric, ordered, or random pattern), such that the output optical signals from the individual micromirrors 934 of the output switch backplane 924 are aligned and directed at the output optical fibers 912. The micromirrors 932 can be arranged in an array (e.g., in a geometric, ordered, or random pattern) on the switch backplane 922 and the micromirrors 934 can be arranged in an array (e.g., in a geometric, ordered, or random pattern) on the switch backplane 924. As shown in FIG. 39, a micromirror 932 on the input switch backplane 922 can be used to direct an optical signal from an aligned input optical fiber 910 toward any one of the micromirrors 934 on the output switch backplane 924 and the micromirror 934 can be used to direct the optical signal to any one of the output optical fibers 912. The micromirrors 932, 934 can be electrically connected to the switch controller 940 which produces the electrical signals that are used to control the angular orientation of the micromirrors 932, 934 to control the path of optical signals through the switch 900. Switch 900 differs from switch 800 in that the length of the optical path of from any of the input optical fibers 910 to one of the output optical fibers 912 can vary widely resulting in wide signal variation. This can be mitigated using the focusing capabilities of the micromirrors to tune or focus the optical signals on longer paths to minimize the signal variation. In accordance with some embodiments of the invention, after the controller 940 defines the signal path, the controller 940 can determine a measure of the length of the signal (e.g., based on the known geometric configuration of the optical fibers and the mirrors) can tune the radius of curvature of the micromirrors to further minimize signal variation.

Other embodiments are within the scope and spirit of the invention. For example, due to the nature of software, functions described above can be implemented using software, hardware, firmware, hardwiring, or combinations of any of these. Features implementing functions may also be physically located at various positions, including being distributed such that portions of functions are implemented at different physical locations.

Further, while the description above refers to the invention, the description may include more than one invention.

What is claimed is:

1. A device comprising:
a base substrate;
a platform suspended over the base substrate;
a plurality of support elements supporting the platform over the base substrate, wherein each support element has a first end and a second end, wherein the first end of each support element is mounted on the base substrate and connected to an electrical source, and wherein the second end of each support element is suspended over the base substrate, the plurality of support elements being configured to cause the platform to move relative to the base substrate; and
a micromirror including a first portion directly attached to the platform such that the first portion cannot move relative to the platform and a second portion that is not attached to the platform such that the second portion can move relative to the platform, the micromirror including a material that is configured to enable the second portion of the micromirror to move relative to the platform responsive to an input.

2. The device of claim 1, further comprising a plurality of spring elements, wherein each spring element has a first end and a second end, and wherein the first end of each spring element is connected to the second end of each support element, and wherein the second end of each spring element is connected to the platform.

3. The device of claim 1, wherein each support element includes a multimorph material movable in response to an electrical signal.

4. The device of claim 1, wherein the plurality of support elements are configured to enable the platform to (i) tip along a first axis; (ii) tilt along a second axis; (iii) elevate relative to the base substrate, or (iv) any combination of (i)-(iii).

5. The device of claim 4, wherein the tipping of the platform along the first axis, the tilting of the platform along the second axis, or both has a range of −20 degrees to +20 degrees.

6. The device of claim 1, wherein the movement of the second portion of the micromirror relative to the platform responsive to the input causes a change in (i) a curvature of the micromirror, (ii) a focal length of the micromirror, or (iii) both (i) and (ii).

7. The device of claim 4, wherein the plurality of support elements is configured to elevate the platform relative to the base substrate by about 300 µm.

8. The device of claim 3, wherein each support element comprises a first layer comprising polysilicon, and a second layer comprising gold, wherein the second layer is disposed on top of the first layer.

9. The device of claim 8, further comprising an adhesion layer comprising chromium or titanium disposed between the first layer and the second layer.

10. The device of claim 2, wherein each of the plurality of spring elements is stretchable.

11. The device of claim 2, wherein each of the plurality of spring elements has a serpentine shape.

12. The device of claim 2, wherein each of the plurality of spring elements comprises a semiconductor or metal.

13. The device of claim 12, wherein each of the plurality of spring elements comprises polysilicon.

14. The device of claim 12, wherein each of the plurality of spring elements comprises an alloy.

15. The device of claim 1, wherein the platform has a shape selected from the group consisting of circular, oval, square, rectangular, pentagonal, and hexagonal.

16. The device of claim 1, wherein the platform comprises a semiconductor or metal.

17. The device of claim 16, wherein the platform comprises polysilicon or single crystalline silicon.

18. The device of claim 1, wherein the first portion of the micromirror includes a center of the micromirror and the second portion surrounds the first portion.

19. The device of claim 1, wherein the micromirror comprises a plurality of segments.

20. The device of claim 1, wherein the micromirror comprises a first layer comprising polysilicon, and a second layer comprising gold, wherein the second layer is disposed on top of the first layer.

21. The device of claim 20, further comprising an adhesion layer comprising chromium or titanium disposed between the first layer and the second layer.

22. The device of claim 1, further comprising a heating element positioned underneath the platform and adapted to heat up the micromirror.

23. An optical network switch system comprising:
a switch backplane;
a base substrate supported by the switch backplane;
a platform suspended over the base substrate;
a plurality of support elements supporting the platform over the base substrate, wherein each support element has a first end and a second end, wherein the first end of each support element is mounted on the base substrate and connected to an electrical source, and wherein the second end of each support element is suspended over the base substrate, the plurality of support elements being configured to cause the platform to move relative to the base substrate;
a micromirror including a first portion directly attached to the platform such that the first portion cannot move relative to the platform and a second portion that is not attached to the platform such that the second portion can move relative to the platform, the micromirror including a material that is configured to enable the second portion of the micromirror to move relative to the platform responsive to an input, the micromirror being positioned to receive an optical signal from an input optical fiber and direct the optical signal along a signal path towards an output optical fiber.

24. The optical network switch of claim 23, wherein the plurality of micromirror devices are arranged on the switch backplane in a geometric, ordered, or random pattern.

25. The optical network switch of claim 23, further comprising a switch controller configured to send signals to at least one of the plurality of support elements of the first one of the plurality of micromirror devices and actuate the micromirror of the first one of the plurality of micromirror devices to direct the optical signal along a predefined signal path.

26. A system comprising:
 a base substrate;
 a platform suspended over the base substrate;
 a plurality of support elements supporting the platform over the base substrate, wherein each support element has a first end and a second end, wherein the first end of each support element is mounted on the base substrate and connected to an electrical source, and wherein the second end of each support element is suspended over the base substrate, the plurality of support elements being configured to cause the platform to move relative to the base substrate;
 a micromirror including a first portion directly attached to the platform such that the first portion cannot move relative to the platform and a second portion that is not attached to the platform such that the second portion can move relative to the platform, the micromirror including a material that is configured to enable the second portion of the micromirror to move relative to the platform responsive to an input; and
 at least one light source positioned to direct light toward the micromirror, whereby application of an electrical signal to at least one of the plurality of support elements moves the platform to aid in controlling a reflection of light received from the at least one light source.

27. The system of claim 26, further comprising a control unit configured to control the application of the electrical signal to at least one of the plurality of support elements.

28. The device of claim 1, wherein the material of the micromirror comprises a multimorph material and the input is heat.

29. The device of claim 1, wherein the material of the micromirror comprises a magnetic material and the input is a magnetic field.

30. The device of claim 6, wherein the change in focal length is in the range of −0.48 mm to 20.5 mm.

31. The device of claim 1, wherein the micromirror and the platform are monolithic.

\* \* \* \* \*